United States Patent
Chang et al.

(10) Patent No.: US 12,061,743 B2
(45) Date of Patent: Aug. 13, 2024

(54) HAND AND TOTEM INPUT FUSION FOR WEARABLE SYSTEMS

(71) Applicant: Magic Leap, Inc., Plantation, FL (US)

(72) Inventors: Yuh-Lin Eugene Chang, Fremont, CA (US); Lee Jonathon Nau, San Jose, CA (US); Ameet Jain, San Jose, CA (US); Peter Andreas Klinkmueller, Jr., San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 4 days.

(21) Appl. No.: 17/184,473

(22) Filed: Feb. 24, 2021

(65) Prior Publication Data
US 2021/0263592 A1    Aug. 26, 2021

Related U.S. Application Data

(60) Provisional application No. 62/981,930, filed on Feb. 26, 2020.

(51) Int. Cl.
*G06F 3/01*    (2006.01)
*G06T 7/70*    (2017.01)

(52) U.S. Cl.
CPC ............... *G06F 3/017* (2013.01); *G06T 7/70* (2017.01); *G06T 2207/20221* (2013.01)

(58) Field of Classification Search
CPC ........ G06F 3/017; G06F 3/038; G06F 3/0346; G06F 3/011; G06F 3/014; G06F 3/012;
(Continued)

(56) References Cited

U.S. PATENT DOCUMENTS 9,111,351 B2 *   8/2015   Martensson .............. G06T 7/73
10,198,874 B2 *  2/2019   Dearman .............. G02B 27/017
(Continued)

FOREIGN PATENT DOCUMENTS

WO    WO-2019142329 A1 *   7/2019   ............... G06F 3/01

OTHER PUBLICATIONS

N. Rossol, I. Cheng and A. Basu, "A Multisensor Technique for Gesture Recognition Through Intelligent Skeletal Pose Analysis," in IEEE Transactions on Human-Machine Systems, vol. 46, No. 3, pp. 350-359, Jun. 2016 (Year: 2016).*
(Continued)

*Primary Examiner* — Andrew L Tank
(74) *Attorney, Agent, or Firm* — KILPATRICK TOWNSEND & STOCKTON LLP

(57) ABSTRACT

Techniques for fusing hand pose data associated with a user's hand with handheld device pose data associated with a handheld device. In some embodiments, both of a user's hands are utilized in embodiments described herein. The hand pose data including a position of the hand within a reference frame is captured using a hand pose sensor. The handheld device pose data including a position of the handheld device within the reference frame is captured using a handheld device pose sensor. A pose discrepancy between the hand pose data and the handheld device pose data is determined, the pose discrepancy including at least a position discrepancy between the position of the hand and the position of the handheld device. A fusion operation is performed based on the pose discrepancy.

17 Claims, 19 Drawing Sheets

(58) Field of Classification Search
CPC ............. G06T 7/70; G06T 2207/20221; G06T 19/006; G06T 7/73; A61B 2034/2046; A63F 13/428
See application file for complete search history.

(56) References Cited

U.S. PATENT DOCUMENTS

| | | | | |
|---|---|---|---|---|
| 2015/0235367 | A1* | 8/2015 | Langer | G06K 9/52 348/135 |
| 2015/0247729 | A1* | 9/2015 | Meduna | G01C 21/165 702/150 |
| 2015/0301592 | A1* | 10/2015 | Miller | G06F 3/012 345/156 |
| 2016/0098095 | A1* | 4/2016 | Gonzalez-Banos | A63F 13/92 345/156 |
| 2017/0205903 | A1* | 7/2017 | Miller | G06T 7/174 |
| 2017/0307891 | A1* | 10/2017 | Bucknor | H01H 9/0235 |
| 2017/0336882 | A1* | 11/2017 | Tome | G06F 3/0346 |
| 2017/0357332 | A1* | 12/2017 | Balan | G06F 3/017 |
| 2017/0358139 | A1* | 12/2017 | Balan | G02B 27/017 |
| 2017/0371403 | A1* | 12/2017 | Wetzler | G06K 9/78 |
| 2018/0189568 | A1* | 7/2018 | Powderly | G06T 7/70 |
| 2018/0330521 | A1* | 11/2018 | Samples | A63F 13/42 |
| 2019/0050062 | A1* | 2/2019 | Chen | G06T 7/70 |
| 2019/0250708 | A1* | 8/2019 | Gupta | G02B 27/017 |
| 2019/0318501 | A1* | 10/2019 | Balan | A63F 13/211 |
| 2020/0226786 | A1* | 7/2020 | Fitzgibbon | G06T 7/251 |
| 2020/0310539 | A1* | 10/2020 | Barachant | G06F 3/015 |
| 2021/0096726 | A1* | 4/2021 | Faulkner | G06F 3/04883 |

OTHER PUBLICATIONS

A. Steed and S. Julier, "Behaviour-aware sensor fusion: Continuously inferring the alignment of coordinate systems from user behaviour," 2013 IEEE International Symposium on Mixed and Augmented Reality (ISMAR), 2013, pp. 163-172, doi: 10.1109/ISMAR.2013.6671776. (Year: 2013).*

Alatise, M.B.; Hancke, G.P. Pose Estimation of a Mobile Robot Based on Fusion of IMU Data and Vision Data Using an Extended Kalman Filter. Sensors 2017, 17, 2164, pp. 1-22 https://doi.org/10.3390/s17102164 (Year: 2017).*

Hincapié-Ramos et al., 2015. GyroWand: IMU-based Raycasting for Augmented Reality Head-Mounted Displays. In Proceedings of the 3rd ACM Symposium on Spatial User Interaction (SUI '15). Association for Computing Machinery, New York, NY, USA, 89-98. https://doi.org/10.1145/2788940.2788947 (Year: 2015).*

International Application No. PCT/US2021/019483, International Search Report and Written Opinion mailed on May 6, 2021, 9 pages.
Application No. PCT/US2021/019483 , "International Preliminary Report on Patentability", Sep. 9, 2022, 7 pages.
European Application No. 21760169.9, "Extended European Search Report", Jul. 18, 2023, 8 pages.

* cited by examiner

HAND AND TOTEM INPUT FUSION FOR WEARABLE SYSTEMS

CROSS-REFERENCES TO RELATED APPLICATIONS

This application claims the benefit of priority to U.S. Provisional Patent Application No. 62/981,930, filed Feb. 26, 2020, entitled "HAND AND TOTEM INPUT FUSION FOR WEARABLE SYSTEMS," the entire content of which is incorporated herein by reference for all purposes.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to techniques for improving the performance and user experience of optical systems. More particularly, embodiments of the present disclosure provide methods for operating an augmented reality (AR), virtual reality (VR), or mixed reality (MR) wearable system in which a handheld device is employed for assisting operation of the wearable system. A summary of the present disclosure is provided below as a list of examples. As used below, any reference to a series of examples is to be understood as a reference to each of those examples disjunctively (e.g., "Examples 1-4" is to be understood as "Examples 1, 2, 3, or 4").

Example 1 is a method of fusing hand pose data with handheld device pose data, the method comprising: capturing the hand pose data including a position of a hand within a reference frame using a hand pose sensor; capturing the handheld device pose data including a position of a handheld device within the reference frame using a handheld device pose sensor; determining a pose discrepancy between the hand pose data and the handheld device pose data, the pose discrepancy including a position discrepancy between the position of the hand and the position of the handheld device; and performing a fusion operation based on the pose discrepancy.

Example 2 is the method of example(s) 1, wherein the position discrepancy is a distance between the position of the hand and the position of the handheld device.

Example 3 is the method of example(s) 2, further comprising: determining whether the distance is greater than or less than a distance threshold.

Example 4 is the method of example(s) 3, wherein if it is determined that the distance is greater than the distance threshold, performing the fusion operation includes: determining that the handheld device is not being held by the hand.

Example 5 is the method of example(s) 3, wherein if it is determined that the distance is less than or equal to the distance threshold, performing the fusion operation includes: determining that the handheld device is being held by the hand.

Example 6 is the method of example(s) 3, wherein if it is determined that the distance is greater than the distance threshold, performing the fusion operation includes: suppressing the hand pose data; or suppressing the handheld device pose data.

Example 7 is the method of example(s) 3, wherein if it is determined that the distance is less than or equal to the distance threshold, performing the fusion operation includes: using the hand pose data to augment the handheld device pose data; using the handheld device pose data to augment the hand pose data; or generating combined pose data using the hand pose data and the handheld device pose data.

Example 8 is the method of example(s) 1, wherein capturing the hand pose data using the hand pose sensor includes: identifying a plurality of keypoints associated with the hand; and determining the position of the hand based on the plurality of keypoints.

Example 9 is the method of example(s) 1, wherein the hand pose data includes both the position of the hand and the orientation of the hand.

Example 10 is the method of example(s) 1, wherein the hand pose data includes the position of the hand but not the orientation of the hand.

Example 11 is the method of example(s) 1, wherein the handheld device pose data includes both the position of the handheld device and the orientation of the handheld device.

Example 12 is the method of example(s) 1, wherein the handheld device pose data includes the position of the handheld device but not the orientation of the handheld device.

Example 13 is the method of example(s) 1, wherein: the hand pose data includes an orientation of the hand; and the handheld device pose data includes an orientation of the handheld device.

Example 14 is the method of example(s) 13, wherein the pose discrepancy includes an orientation discrepancy between the orientation of the hand and the orientation of the handheld device.

Example 15 is the method of example(s) 14, wherein the orientation discrepancy is an angle offset between the orientation of the hand and the orientation of the handheld device.

Example 16 is the method of example(s) 15, further comprising: determining whether the angle offset is greater than or less than an angle threshold.

Example 17 is the method of example(s) 13, modifying the position of the handheld device based on a three-dimensional (3D) model of the handheld device and the orientation of the handheld device.

Example 18 is the method of example(s) 1, wherein the hand pose sensor is different from the handheld device pose sensor.

Example 19 is the method of example(s) 1, wherein the hand pose sensor and the handheld device pose sensor are a same sensor.

Example 20 is the method of example(s) 1, wherein the hand pose sensor is an image capture device.

Example 21 is the method of example(s) 1, wherein the hand pose sensor is a depth sensor.

Example 22 is the method of example(s) 1, wherein the hand pose sensor is mounted to a headset.

Example 23 is the method of example(s) 1, wherein the handheld device pose sensor includes an electromagnetic (EM) transmitter and an EM receiver.

Example 24 is the method of example(s) 23, wherein the EM transmitter is mounted to the handheld device and the EM receiver is mounted to a headset.

Example 25 is a system comprising: a hand pose sensor configured to capture hand pose data including a position of a hand within a reference frame; and a handheld device pose sensor configured to capture handheld device pose data including a position of a handheld device within the reference frame; one or more processors in communication with the hand pose sensor and the handheld device pose sensor, the one or more processors configured to perform operations comprising: determining a pose discrepancy between the hand pose data and the handheld device pose data, the pose discrepancy including a position discrepancy between the position of the hand and the position of the handheld device; and performing a fusion operation based on the pose discrepancy.

Example 26 is the system of example(s) 25, wherein the position discrepancy is a distance between the position of the hand and the position of the handheld device.

Example 27 is the system of example(s) 26, further comprising: determining whether the distance is greater than or less than or equal to a distance threshold.

Example 28 is the system of example(s) 27, wherein if it is determined that the distance is greater than the distance threshold, performing the fusion operation includes: determining that the handheld device is not being held by the hand.

Example 29 is the system of example(s) 27, wherein if it is determined that the distance is less than or equal to the distance threshold, performing the fusion operation includes: determining that the handheld device is being held by the hand.

Example 30 is the system of example(s) 27, wherein if it is determined that the distance is less than the distance threshold, performing the fusion operation includes: suppressing the hand pose data; or suppressing the handheld device pose data.

Example 31 is the system of example(s) 27, wherein if it is determined that the distance is greater than the distance threshold, performing the fusion operation includes: suppressing the hand pose data; or suppressing the handheld device pose data.

Example 32 is the system of example(s) 27, wherein if it is determined that the distance is less than or equal to the distance threshold, performing the fusion operation includes: using the hand pose data to augment the handheld device pose data; using the handheld device pose data to augment the hand pose data; or generating combined pose data using the hand pose data and the handheld device pose data.

Example 33 is the system of example(s) 25, wherein capturing the hand pose data using the hand pose sensor includes: identifying a plurality of keypoints associated with the hand; and determining the position of the hand based on the plurality of keypoints.

Example 34 is the system of example(s) 25, wherein the hand pose data includes both the position of the hand and the orientation of the hand.

Example 35 is the system of example(s) 25, wherein the hand pose data includes the position of the hand but not the orientation of the hand.

Example 36 is the system of example(s) 25, wherein the handheld device pose data includes both the position of the handheld device and the orientation of the handheld device.

Example 37 is the system of example(s) 25, wherein the handheld device pose data includes the position of the handheld device but not the orientation of the handheld device.

Example 38 is the system of example(s) 25, wherein: the hand pose data includes an orientation of the hand; and the handheld device pose data includes an orientation of the handheld device.

Example 39 is the system of example(s) 38, wherein the pose discrepancy includes an orientation discrepancy between the orientation of the hand and the orientation of the handheld device.

Example 40 is the system of example(s) 38, modifying the position of the handheld device based on a three-dimensional (3D) model of the handheld device and the orientation of the handheld device.

Example 41 is the system of example(s) 39, wherein the orientation discrepancy is an angle offset between the orientation of the hand and the orientation of the handheld device.

Example 42 is the system of example(s) 41, further comprising: determining whether the angle offset is greater than or less than an angle threshold.

Example 43 is the system of example(s) 38, modifying the position of the handheld device based on a three-dimensional (3D) model of the handheld device and the orientation of the handheld device.

Example 44 is the system of example(s) 25, wherein the hand pose sensor is different from the handheld device pose sensor.

Example 45 is the system of example(s) 25, wherein the hand pose sensor and the handheld device pose sensor are a same sensor.

Example 46 is the system of example(s) 25, wherein the hand pose sensor is an image capture device.

Example 47 is the system of example(s) 25, wherein the hand pose sensor is a depth sensor.

Example 48 is the system of example(s) 25, wherein the hand pose sensor is mounted to a headset.

Example 49 is the system of example(s) 25, wherein the handheld device pose sensor includes an electromagnetic (EM) transmitter and an EM receiver.

Example 50 is the system of example(s) 49, wherein the EM transmitter is mounted to the handheld device and the EM receiver is mounted to a headset.

Example 51 is a system comprising: at least one wearable component configured to be worn by a user; a plurality of electronic hardware components, at least a portion of which are contained within or attached to the at least one wearable component, the plurality of electronic hardware components comprising: a display configured to present content to the user; a plurality of sensors, at least one of which comprises an image capture device; and at least one processor in communication with the display, the plurality of sensors, and a portable input device that is configured to be held in a hand of the user, wherein the at least one processor is configured to: receive image data from the image capture device; receive data from one or more of the plurality of sensors different from the image capture device; determine whether the portable input device is positioned less than at least one threshold distance away from the hand of the user based at least in part on the image data received from the image capture device and the data received from the one or more of the plurality of sensors different from the image capture device; and control operation of the display based at least in part on whether the portable input device is determined to be positioned less than the at least one threshold distance away from the hand of the user.

Example 52 is the system of example(s) 50, wherein to determine whether the portable input device is positioned less than at least one threshold distance away from the hand of the user and control operation of the display, the at least one processor is configured to: determine whether the portable input device is positioned within a volume defined relative to the hand of the user based at least in part on the image data received from the image capture device and the data received from the one or more of the plurality of sensors different from the image capture device; and control operation of the display based at least in part on whether the portable input device is determined to be positioned within the volume defined relative to the hand of the user.

Example 53 is the system of example(s) 51, wherein the volume defined relative to the hand of the user is spherical or ellipsoidal in shape.

Example 54 is the system of example(s) 51, wherein the at least one processor is further configured to: determine one or both of a positon and an orientation of the hand of the user based at least in part on the image data received from the image capture device, and determine one or both of a positon and an orientation of the portable input device based at least in part on the data received from the one or more of the plurality of sensors different from the image capture device, wherein the at least one processor is configured to define the volume relative to the hand of the user based at least in part on the position of the hand of the user, the orientation of the hand of the user, the position of the portable input device, the orientation of the portable input device, or a combination thereof.

Example 55 is the system of example(s) 53, wherein the at least one processor is configured to adjust one or more parameters of the volume based at least in part on one or more factors, wherein the one or more parameters of the volume comprise a position of the volume, an orientation of the volume, a size of the volume, a shape of the volume, or a combination thereof, and wherein the one or more factors comprise at least one of: a distance between the at least one wearable component and the portable input device, a distance between the at least one wearable component and the hand of the user, whether the portable input device or the hand of the user is determined to be positioned closer to the at least one wearable component, data received from some or all of the plurality of sensors, or data received from the portable input device.

Example 56 is the system of example(s) 51, wherein the volume defined relative to the hand of the user comprises a first volume, and wherein the at least one processor is further configured to: determine whether the portable input device is positioned within a second volume defined relative to the user or to the at least one wearable component based at least in part on the image data received from the image capture device and the data received from the one or more of the plurality of sensors different from the image capture device, and wherein to control operation of the display based at least in part on whether the portable input device is determined to be positioned within the volume defined relative to the hand of the user, the at least one processor is configured to: control operation of the display based at least in part on (i) whether the portable input device is determined to be positioned within the first volume defined relative to the hand of the user, or (ii) whether the portable input device is determined to be positioned within the second volume defined relative to the user or to the at least one wearable component.

Example 57 is the system of example(s) 55, wherein the second volume is defined relative to one or more portions of the user different from the hand of the user, the one or more portions of the user comprising one or more portions of the user's chest, shoulders, head, arms, eyes, or a combination thereof.

Example 58 is the system of example(s) 56, wherein the second volume corresponds to a range of locations in three-dimensional space relative to the user that are positioned within the user's reach.

Example 59 is the system of example(s) 50, wherein to control operation of the display based at least in part on whether the portable input device is determined to be positioned less than the at least one threshold distance away from the hand of the user, the at least one processor is configured to: in response to a determination that the portable input device is positioned less than the at least one threshold distance away from the hand of the user, control operation of the display in accordance with a first mode of operation in which user interaction with at least some of the content presented by the display via the portable input device is enabled and hand-based user interaction with at least some of the content presented by the display is limited or disabled; and in response to a determination that the portable input device is not positioned less than the at least one threshold distance away from the hand of the user, control operation of the display in accordance with a second mode of operation in which hand-based user interaction with at least some of the content presented by the display is enabled and user interaction with at least some of the content presented by the display via the portable input device is limited or disabled.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF SPECIFIC EMBODIMENTS

Figure 1A:
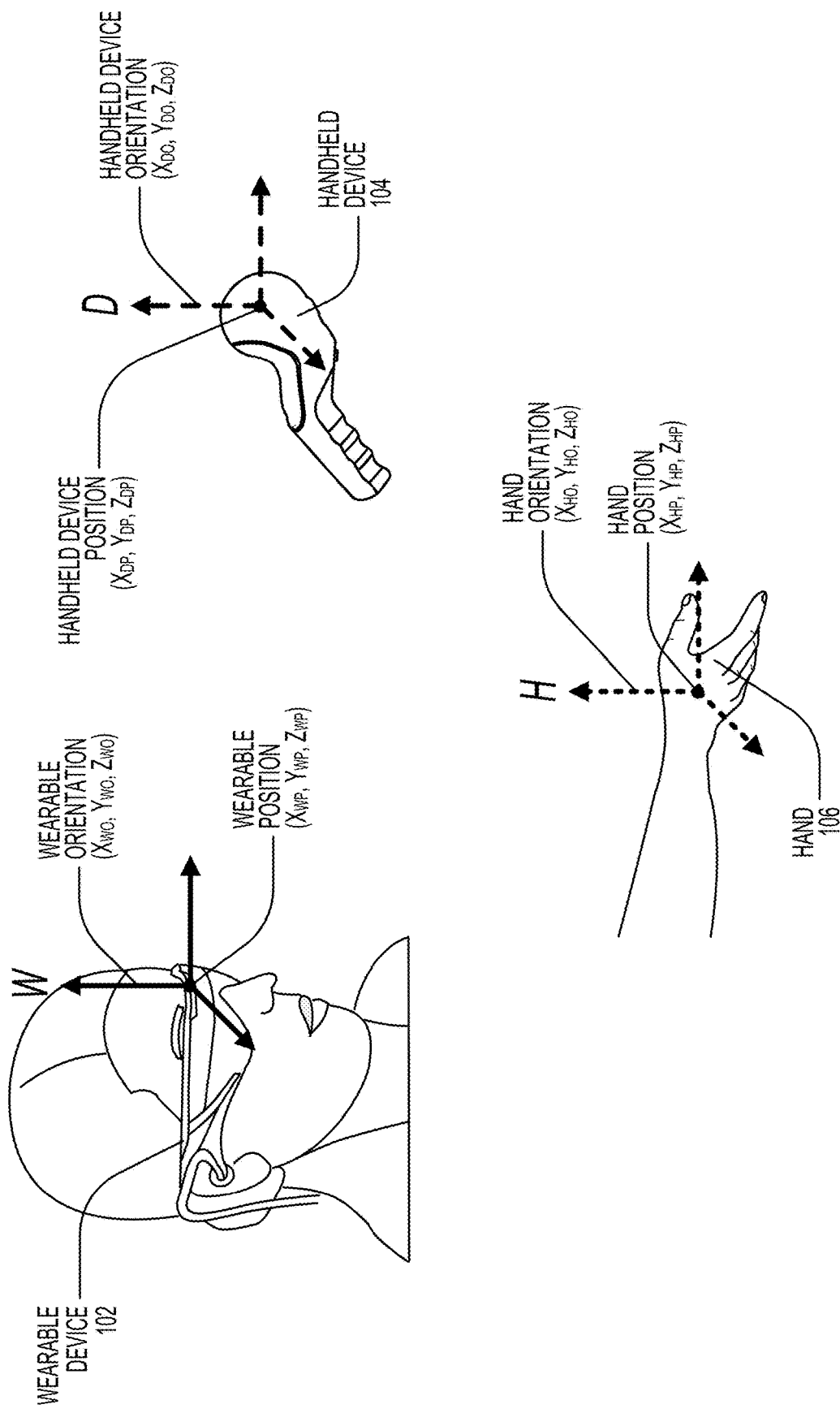
FIGS. 1A and 1B illustrate examples of poses of various components of a wearable system.

A wearable system can present an interactive augmented reality (AR), virtual reality (VR), and/or mixed reality (MR) environment that can include data elements that may be interacted with by a user through a variety of inputs. While modern computing systems are typically engineered to generate a given output based on a single direct input (e.g., a keyboard will relay text input as received from finger strokes of a user, a voice recognition application can create an executable data string based on a user's voice as a direct input, a computer mouse can guide a cursor in response to a user's direct manipulation, etc.), in a data rich and dynamic interaction environment such as an AR/VR/MR environment, a high degree of specificity may be desirable to accomplish a particular task.

Otherwise, in the absence of precise inputs, a computing system may suffer a high error rate and may cause incorrect computer operations to be performed. For example, when a user intends to move an object in a 3D space using a touchpad, the computing system may not be able to correctly interpret a move command if the user does not specify a destination or specify the object using the touchpad. As another example, inputting a string of text using a virtual keyboard (e.g., as manipulated with a user input device or by gesture) as the only mode of input can be slow and physically fatiguing, because it requires prolonged fine motor control to type the described keys in mid-air or on a physical surface (e.g., a desk) where the virtual keyboard is rendered.

In many instances, the particular sensor inputs that are used at any point in time can change dynamically as the user interacts with the 3D environment. An input mode can be dynamically added (or "fused" as further described herein) when the device determines that the input mode is providing additional information to aid in the targeting of a virtual object, and an input mode can be dynamically removed if that input mode no longer provides relevant information. For example, the wearable system may determine that a user's head pose and eye gaze are directed at a target object. The device can use these two input modes to assist in selection of the target object. If the device determines that the user is also pointing a totem at the target object, the device can dynamically add the totem input to the head pose and eye gaze inputs, which may provide further certainty that the user intends to select the target object. It can be said that the totem input has "converged" with the head pose input and the eye gaze input. Continuing with this example, if the user glances away from the target object so that the user's eye gaze is no longer directed at the target object, the device may cease using eye gaze input while continuing to use the totem input and the head pose input. In this case, it can be said that the eye gaze input has "diverged" from the totem input and the head pose input.

While many techniques have been developed for determining convergence and divergence events occurring among a number of input modes, one difficulty has been detecting convergence between a totem input (e.g., movement of a handheld device) and a gesture input (e.g., movement of a user's hand) when the totem is near the user's hand but not necessarily being held by the user. For example, a user may place the totem on a surface near the user's hand, in a pocket on the user's shirt or pants, or may switch the totem from one hand to another. In many applications, knowing whether the totem is actually in the user's hand, and which hand the totem is in (or whether the totem is being held by both hands), can affect the virtual objects that the user interacts with. For example, during a game in which multiple users play with a virtual ball and a virtual bat, the user that is hitting the ball may be provided with a totem to represent the virtual bat. Whether the virtual bat should appear as being held by the user's virtual hand would be dependent on whether the totem is actually in the user's hand. As another example, the determination of whether the totem is in the user's hand can affect how the pose data for the totem and the user's hand are used by the wearable system. For example, if the totem is in the user's hand, the pose data for the hand may be used to augment (e.g., increase the accuracy of) the pose data for the totem, and vice-versa.

In some instances, it may be advantageous to suppress the pose data for the user's hand and to instead rely substantially on the pose data for the totem when the totem is in the user's hand. For example, the electromagnetic tracking system employed for determining the pose data for the totem may yield more accurate estimations than the visual tracking system employed for determining the pose data for the user's hand. As such, any attempt to combine or augment the pose data for the totem using the pose data for the user's hand may decrease its accuracy.

Accurate pose information is important for many tasks performed by wearable systems. For example, detection of head pose can facilitate the display system to render virtual objects such that they appear to occupy a space in the real world in a manner that makes sense to the user. In addition, detection of the pose of a real object, such as a handheld device (also referred to herein as a totem, portable input device, or controller), haptic device, or other real physical object, in relation to the user's head or the wearable system may also facilitate the display system in presenting display information to the user to enable the user to interact with certain aspects of the AR/VR/MR system efficiently. At least for AR applications, placement of virtual objects in spatial relation to physical objects (e.g., presented to appear spatially proximate a physical object in two- or three-dimensions) may be a non-trivial problem.

For example, head movement may significantly complicate placement of virtual objects in a view of an ambient environment. Such is true whether the view is captured as an image of the ambient environment and then projected or displayed to the end user, or whether the end user perceives the view of the ambient environment directly. For instance, head movement will likely cause a field of view of the end user to change, which will likely require an update to where various virtual objects are displayed in the field of the view of the end user.

Additionally, head movements may occur within a large variety of ranges and speeds. Head movement speed may vary not only between different head movements, but within or across the range of a single head movement. For instance, head movement speed may initially increase (e.g., linearly or not) from a starting point, and may decrease as an ending point is reached, obtaining a maximum speed somewhere between the starting and ending points of the head movement. Rapid head movements may even exceed the ability of the particular display or projection technology to render images that appear uniform and/or as smooth motion to the end user.

Current approaches for fusing totem and hand gesture inputs for purposes of accurate pose estimation are not performed at satisfactory speed or precision standards. Thus, there is a need for better systems, methods, and other techniques in the context of AR/VR/MR devices. In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

As used herein, the term "pose" may refer to the position and/or the orientation of a component, but does not necessarily imply both the position and orientation unless otherwise indicated. For example, "determining a pose" of a component as used herein may generally refer to determining the position of the component and/or determining the orientation of the component. As another example, "determining a pose" of a component may generally refer to determining at least one of the position or the orientation of the component. As another example, "determining a pose including a position" of a component may generally refer to determining the position and optionally the orientation of the component. As another example, "determining a pose including an orientation" of a component may generally refer to determining the orientation and optionally the position of the component.

Figure 1B:
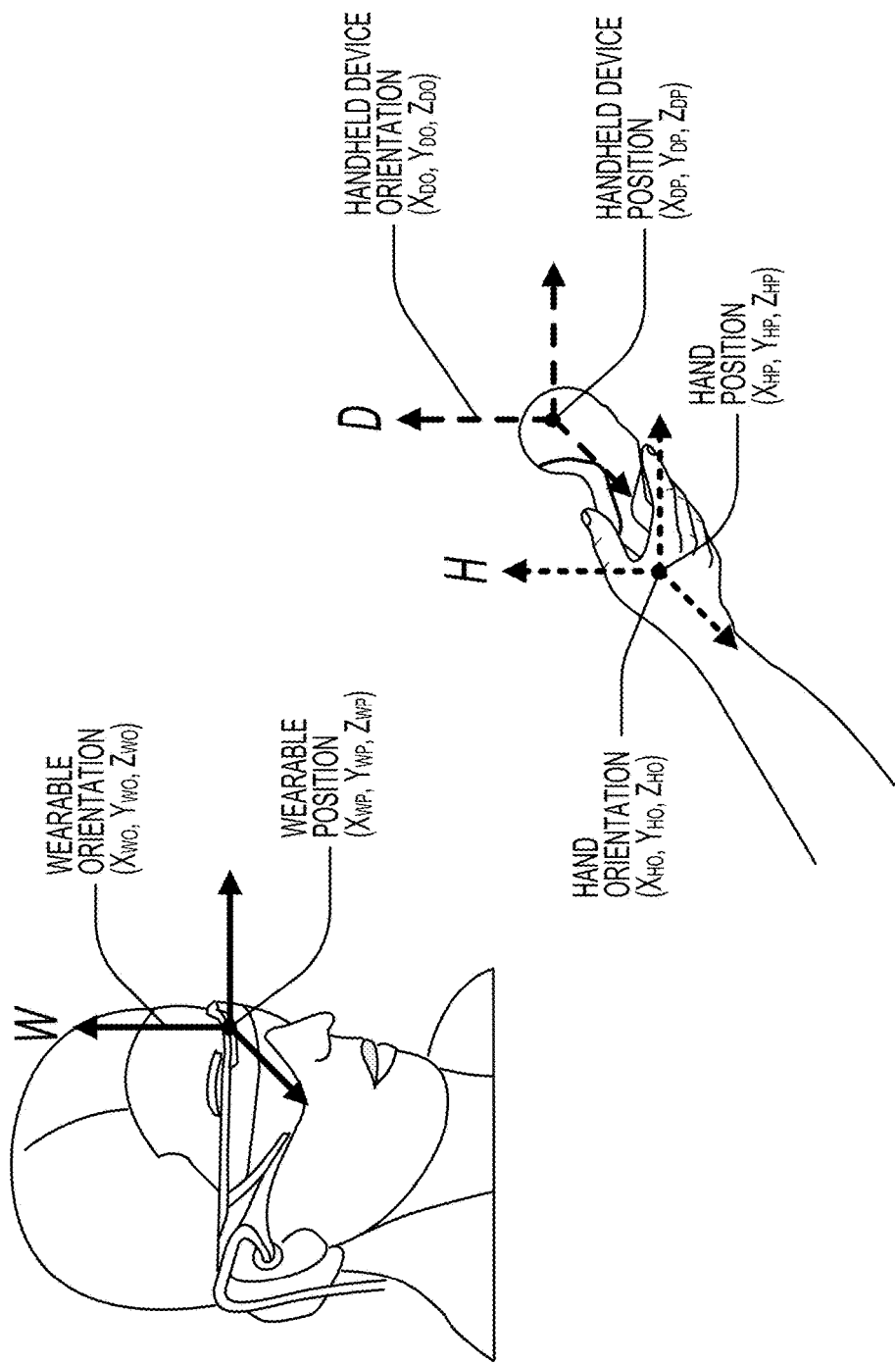

FIGS. 1A and 1B illustrate examples of poses of various components of a wearable system, including a wearable device 102, a handheld device 104, and a user's hand 106. In reference to FIG. 1A, wearable device 102 may have a position ("wearable position") defined as $(X_{WP}, Y_{WP}, Z_{WP})$ with respect to a reference frame and an orientation ("wearable orientation") defined as $(X_{WO}, Y_{WO}, Z_{WO})$ with respect to a reference frame. The position of wearable device 102 may be expressed in X, Y, and Z Cartesian values or in longitude, latitude, and elevation values, among other possibilities. The orientation of wearable device 102 may be expressed in pitch angle, yaw angle, and roll angle values, among other possibilities.

Similarly, handheld device 104 may have a position ("handheld position") defined as $(X_{DP}, Y_{DP}, Z_{DP})$ with respect to a reference frame and an orientation ("handheld orientation") defined as $(X_{DO}, Y_{DO}, Z_{DO})$ with respect to a reference frame. The position of handheld device 104 may be expressed in X, Y, and Z Cartesian values or in longitude, latitude, and elevation values, among other possibilities. The orientation of handheld device 104 may be expressed in pitch angle, yaw angle, and roll angle values, among other possibilities. Similarly, hand 106 may have a position ("hand position") defined as $(X_{HP}, Y_{HP}, Z_{HP})$ with respect to a reference frame and an orientation ("hand orientation") defined as $(X_{HO}, Y_{HO}, Z_{HO})$ with respect to a reference frame. The position of hand 106 may be expressed in X, Y, and Z Cartesian values or in longitude, latitude, and elevation values, among other possibilities. The orientation of hand 106 may be expressed in pitch angle, yaw angle, and roll angle values, among other possibilities.

In some embodiments, the reference frame for each of the positions and orientations may be a world reference frame. In some embodiments, the position and orientation of wearable device 102 may be used as the reference frame such that the position of wearable device 102 may be set as (0, 0, 0) and the orientation of wearable device 102 may be set as (0°, 0°, 0°). Accordingly, the positions and orientations of handheld device 104 and hand 106 may be determined with respect to the position and orientation of wearable device 102.

FIG. 1B shows an example of the user of the wearable system holding handheld device 104 in their hand, causing the positions of handheld device 104 and hand 106 to come close to each other. As such, in some embodiments of the present disclosure, a similarity (e.g., nearness) between the positions of handheld device 104 and hand 106 may be indicative of handheld device 104 being in the user's hand. Furthermore, since the user's hand is generally orientated a particular way when it is engaged with handheld device 104, the similarity between the orientations of handheld device 104 and hand 106 may also be indicative of handheld device 104 being in the user's hand.

Combinations of position and orientation similarities (or, following the same logic, position and orientation dissimilarities or discrepancies) of handheld device 104 and hand 106 as well as their relationships to wearable device 102 can inform the wearable system as to whether the user is holding handheld device 104, which may affect decisions regarding input mode selection and handling.

Figure 2A:
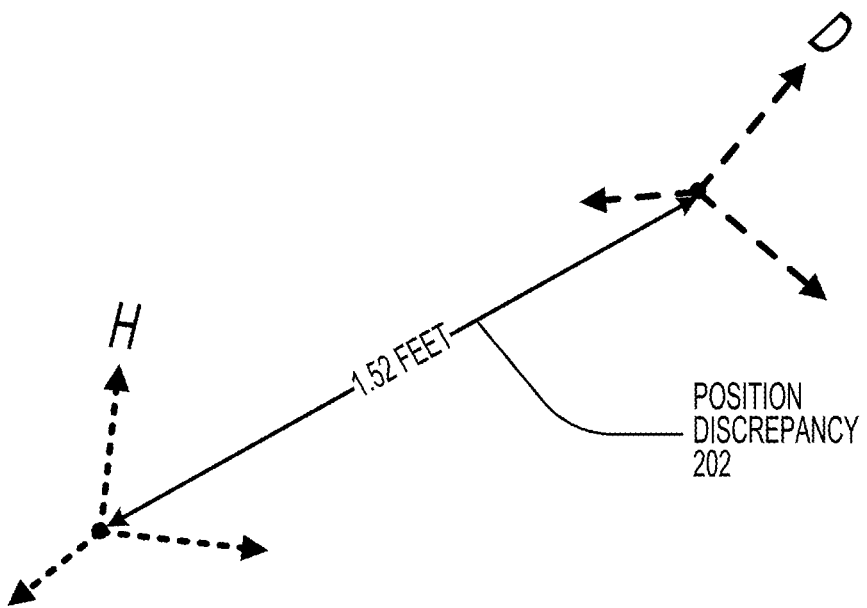
FIGS. 2A and 2B illustrate examples of determining a pose discrepancy between a handheld device and a user's hand.
Figure 2B:
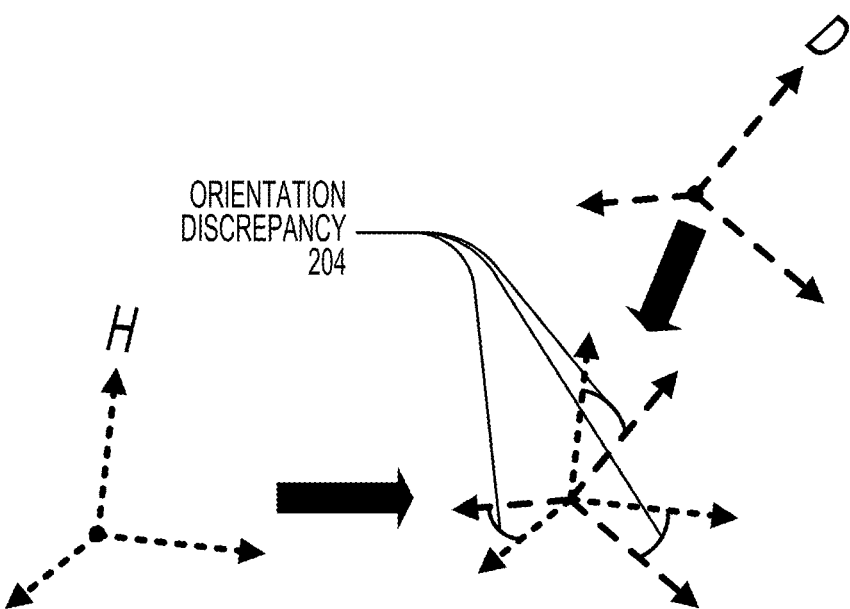

FIGS. 2A and 2B illustrate examples of determining a pose discrepancy between handheld device 104 and hand 106. The pose discrepancy may be calculated as the combination of a position discrepancy 202, which is shown in reference to FIG. 2A, and an orientation discrepancy 204, which is shown in reference to FIG. 2B. In some embodiments, position discrepancy 202 is calculated as the distance between the positions of handheld device 104 and hand 106, and may accordingly be expressed in any unit of length, such as feet or meters. In some embodiments, orientation discrepancy 204 is calculated as the angle between the orientations of handheld device 104 and hand 106, and may accordingly be expressed in any unit for measuring angles, such as radians or degrees.

Figure 3A:
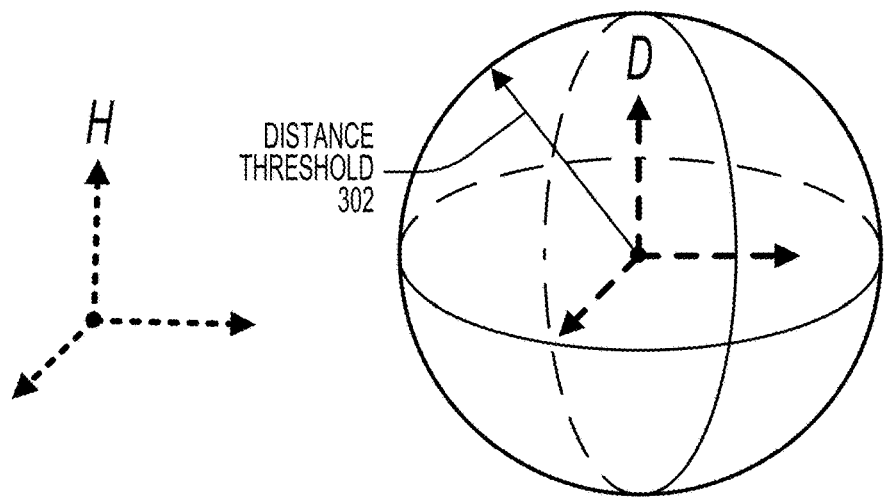
FIGS. 3A-3C illustrate various examples of determining whether a handheld device is being held by a user's hand based on a determined pose discrepancy.
Figure 3B:
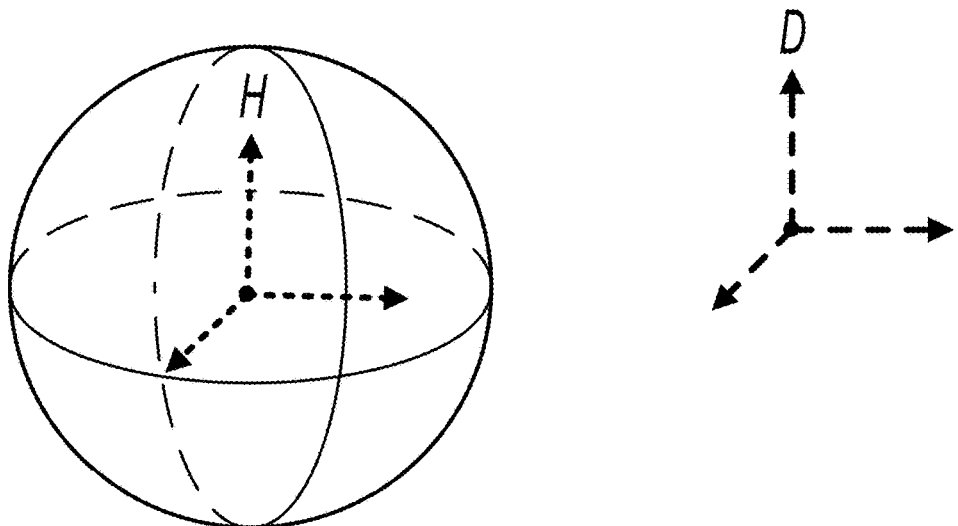
Figure 3C:
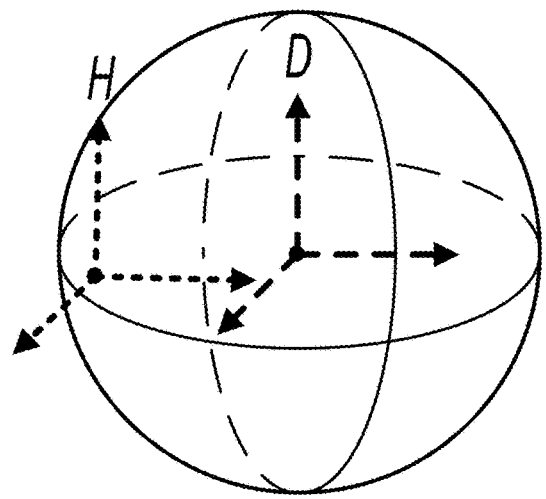

FIGS. 3A-3C illustrate various examples of determining whether handheld device 104 is being held by hand 106 based on a determined pose discrepancy. In some embodiments, a distance threshold 302 may be used as a maximum distance between the positions of handheld device 104 and hand 106 within which it is expected that handheld device 104 would be held by hand 106. Distance threshold 302 may correspond to a distance between one or more locations along an outer surface of a volume (e.g., sphere, ellipsoid, or the like) to a location within the volume, which may coincide with the position of handheld device 104 or the position of hand 106. For example, distance threshold 302 may be used as a radius for a sphere that may be centered at either of the positions. In reference to FIG. 3A, the sphere having a radius equal to distance threshold 302 is centered at the position of handheld device 104. Because the position of hand 106 lies outside the sphere, it is determined that handheld device 104 is not being held by hand 106.

In reference to FIG. 3B, the sphere having a radius equal to distance threshold 302 is centered at the position of hand 106. Because the position of handheld device 104 lies outside the sphere, it is determined that handheld device 104 is not being held by hand 106. In reference to FIG. 3C, the sphere is centered at the position of handheld device 104 and now the position of hand 106 is inside the sphere, and accordingly the handheld device 104 is determined to be held by hand 106.

Figure 4A:
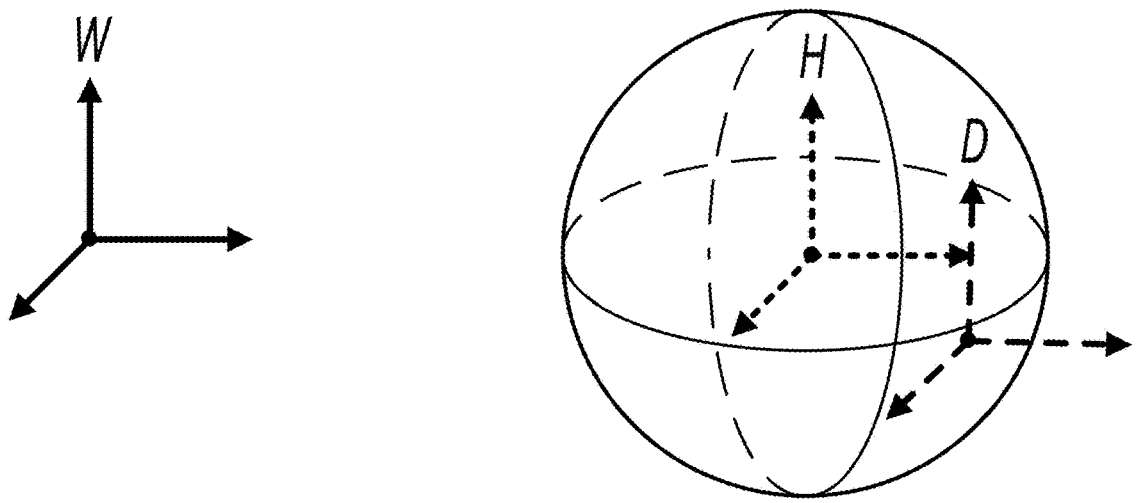
FIGS. 4A-4C illustrate various examples of determining whether a handheld device is being held by a user's hand based on a determined pose discrepancy.
Figure 4B:
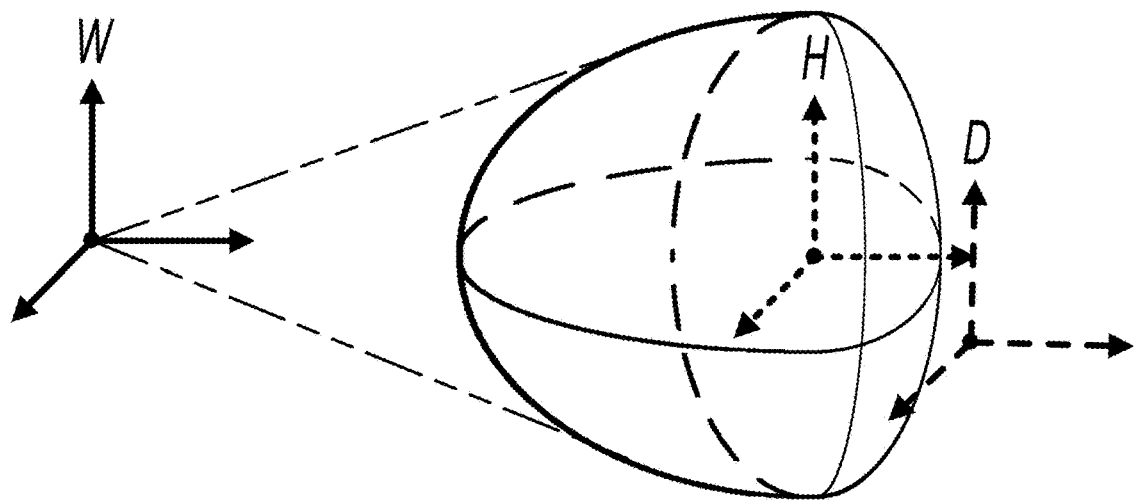
Figure 4C:
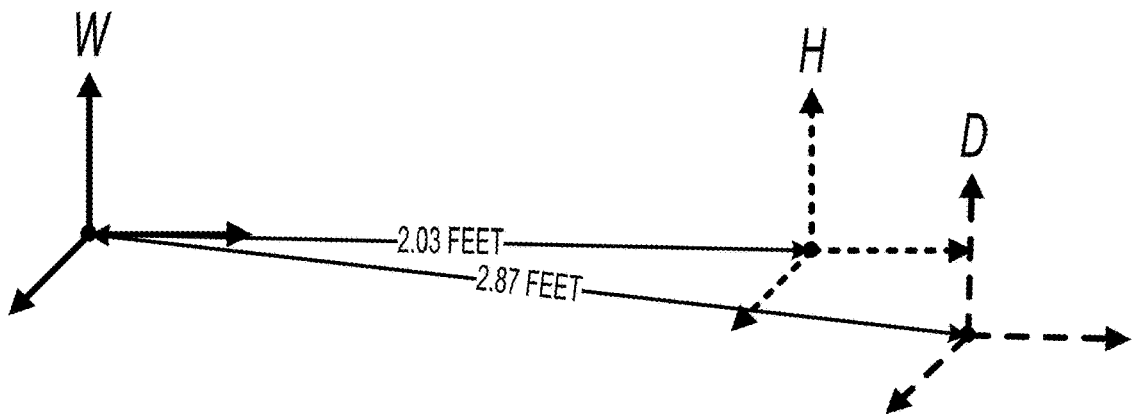

FIGS. 4A-4C illustrate various examples of determining whether handheld device 104 is being held by hand 106 based on a determined pose discrepancy. In reference to FIG. 4A, the poses of each of wearable device 102, handheld device 104, and hand 106 may be determined, and the sphere having a radius equal to distance threshold 302 is centered at the position of hand 106. While the position of handheld device 104 lies within the sphere in FIG. 4A, the sphere is deformed into an ellipsoid in FIG. 4B based on the relationship between the positions of wearable device 102 and hand 106. In the illustrated example, the ellipsoid extends further toward the position of wearable device 102 than away from the position of wearable device 102 to account for the tendency of handheld device 104 to be further from the user (e.g., on a table or desk) when not being held by the user. When the position of handheld device 104 is compared to the ellipsoid, it may be determined that the position lies outside of the ellipsoid and therefore that handheld device 104 is not being held by hand 106.

In some embodiments, a first volume (e.g., sphere, ellipsoid, or the like) may be defined relative to hand 106 (e.g., registered to the position of hand 106), and a second volume may be defined relative to wearable device 102 (e.g., registered to the position of wearable device 102) or to one or more portions of the user other than hand 106 (e.g., registered to the estimated position of the user's chest or shoulders). In some of these embodiments, when the position of handheld device 104 is determined to lie within both the first volume and the second volume (e.g., determined to lie within a region of overlap between the first and second volumes in three-dimensional space), it may be determined that handheld device 104 is being held by hand 106. However, in at least some of these embodiments, when the position of handheld device 104 is determined to lie outside of one or both of the first volume and the second volume (e.g., determined to lie outside of a region of overlap between the first and second volumes in three-dimensional space), it may be determined that handheld device 104 is not being held by hand 106. In such embodiments, the position, orientation, size, and/or shape of the volumetric region of overlap between the first and second volumes may behave in a manner similar to that of the ellipsoidal volume described above in reference to FIG. 4B.

In some examples, the second volume may correspond to a range of locations in three-dimensional space that are within the user's reach. That is, in some examples, one or more outer surfaces of the second volume may be defined at least in part based on an estimated or assumed length, span, or maximum reaching distance of one or both of the user's arms. In these examples, one or more such estimated or assumed parameters may be determined based at least in part on image data acquired by one or more sensors of wearable device 102 (e.g., one or more outward-facing cameras, one or more electromagnetic (EM) sensors, one or more depth cameras or sensors, etc.), data indicating user input (e.g., user input specifying values for one or more parameters) provided through handheld device 104 and/or through one or more user interface components of wearable device 102, data acquired or output by one or more sensors of handheld device 104 (e.g., one or more cameras, one or more inertial measurement units (IMUs), or the like), data received over one or more communication networks, and the like.

In some implementations, the first volume may not be defined relative to hand 106, but instead defined relative to handheld device 104 (e.g., registered to the position of handheld device 104). In such implementations, it may be determined that handheld device 104 is being held by hand 106 when the position of hand 106 is determined to lie within both the first volume and the second volume (e.g., determined to lie within a region of overlap between the first and second volumes in three-dimensional space), and it may be determined that handheld device 104 is not being held by hand 106 when the position of hand 106 is determined to lie outside of one or both of the first volume and the second volume (e.g., determined to lie outside of a region of overlap between the first and second volumes in three-dimensional space). In some embodiments, the position of handheld device 104 or hand 106 may be compared to a region of overlap between two or more (e.g., three, four, five, etc.) different volumes in three-dimensional space. Other configurations are possible.

In reference to FIG. 4C, in some embodiments, the distances between the position of wearable device 102 and the positions of handheld device 104 and hand 106 may be determined and used to assist the determination of whether handheld device 104 is being held by hand 106. For example, in some embodiments, the two distances may be compared to each other to determine whether handheld device 104 or hand 106 is further from wearable device 102. In some instances, it may only be determined that handheld device 104 is not being held by hand 106 if handheld device 104 is further from wearable device 102 than hand 106 (i.e., the distance between the positions of wearable device 102 and hand 106 is less than the distance between the positions of wearable device 102 and handheld device 104). In some embodiments, a second distance threshold may be used to determine whether handheld device 104 is further from wearable device 102 than hand 106 by at least the second distance threshold (i.e., the distance between the positions of wearable device 102 and hand 106 is less than the distance between the positions of wearable device 102 and handheld device 104 by at least the second distance threshold).

Figure 5:
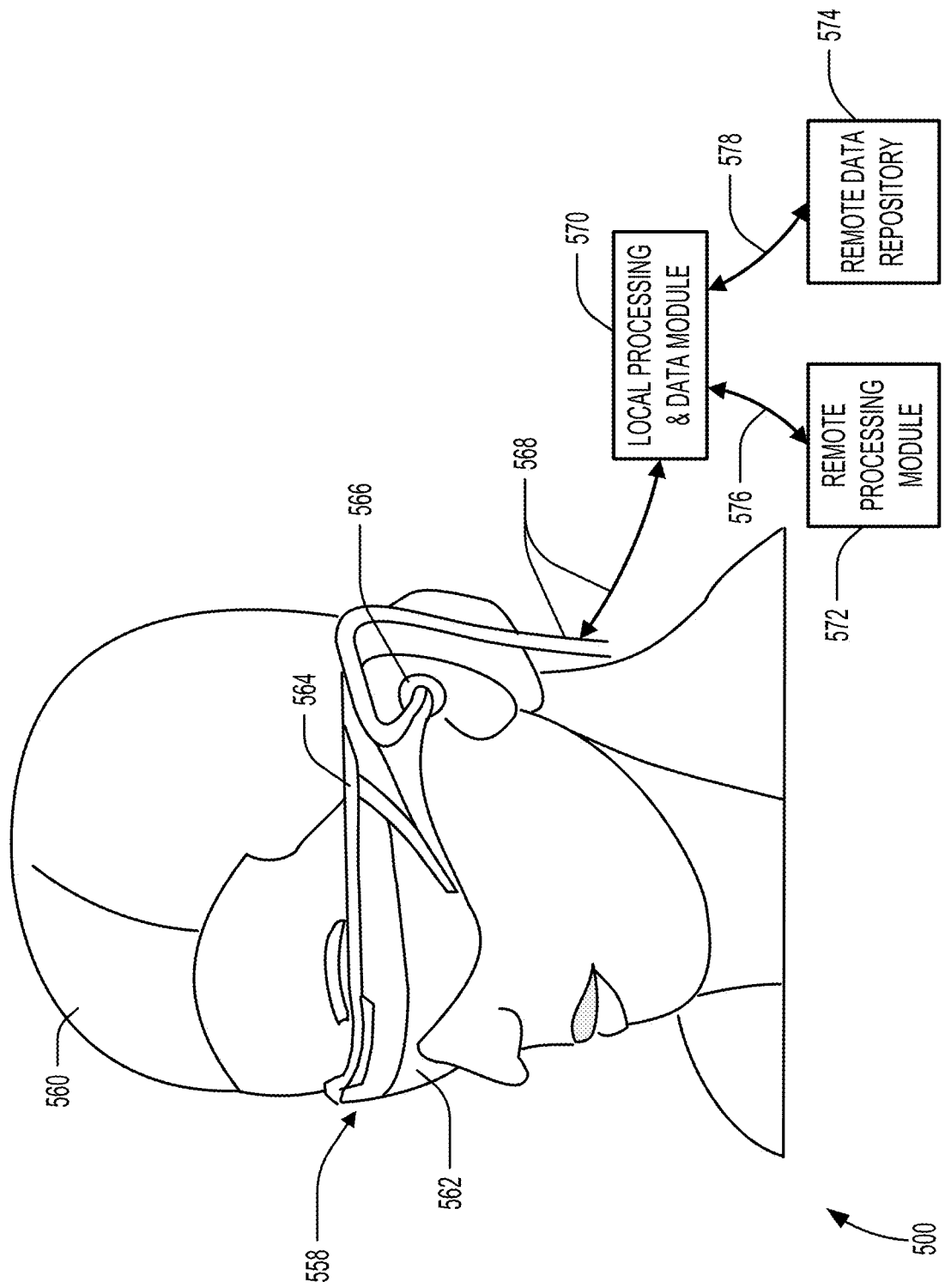
FIG. 5 illustrates various possible components of a wearable AR/VR/MR system.

FIG. 5 illustrates various possible components of a wearable AR/VR/MR system 500. In the illustrated embodiment, a wearable system user 560 is depicted wearing a head mounted component 558 featuring a frame 564 structure coupled to a display system 562 positioned in front of the eyes of the user. A speaker 566 is coupled to frame 564 in the depicted configuration and is positioned adjacent the ear canal of the user (in one embodiment, another speaker, not shown, is positioned adjacent the other ear canal of the user to provide for stereo/shapeable sound control). Display system 562 is operatively coupled (as indicated by 568), such as by a wired lead or wireless connectivity, to a local processing and data module 570 which may be mounted in a variety of configurations, such as fixedly attached to frame 564, fixedly attached to a helmet or hat, removably attached to the torso of user 560 in a backpack-style configuration, or removably attached to the hip of user 560 in a belt-coupling style configuration.

Local processing and data module 570 may include a power-efficient processor or controller, as well as digital memory, such as flash memory, both of which may be utilized to assist in the processing, caching, and storage of data that is (1) captured from sensors which may be operatively coupled to frame 564, such as image capture devices (such as cameras), microphones, inertial measurement units, accelerometers, compasses, GPS units, radio devices, and/or gyroscopes; and/or is (2) acquired and/or processed using remote processing module 572 and/or remote data repository 574, possibly for passage to display system 562 after such processing or retrieval.

Local processing and data module 570 may be operatively coupled (as indicated by 576, 578), such as via one or more wired or wireless communication links, to remote processing module 572 and remote data repository 574 such that these remote modules 572, 574 are operatively coupled to each other and available as resources to local processing and data module 570. In one embodiment, remote processing module 572 may include one or more relatively powerful processors or controllers configured to analyze and process data and/or image information. In one embodiment, remote data repository 574 may include a relatively large-scale digital data storage facility, which may be available through the internet or other networking configuration in a "cloud" resource configuration. In one embodiment, all data is stored and all computation is performed in the local processing and data module, allowing fully autonomous use from any remote modules.

Figure 6:
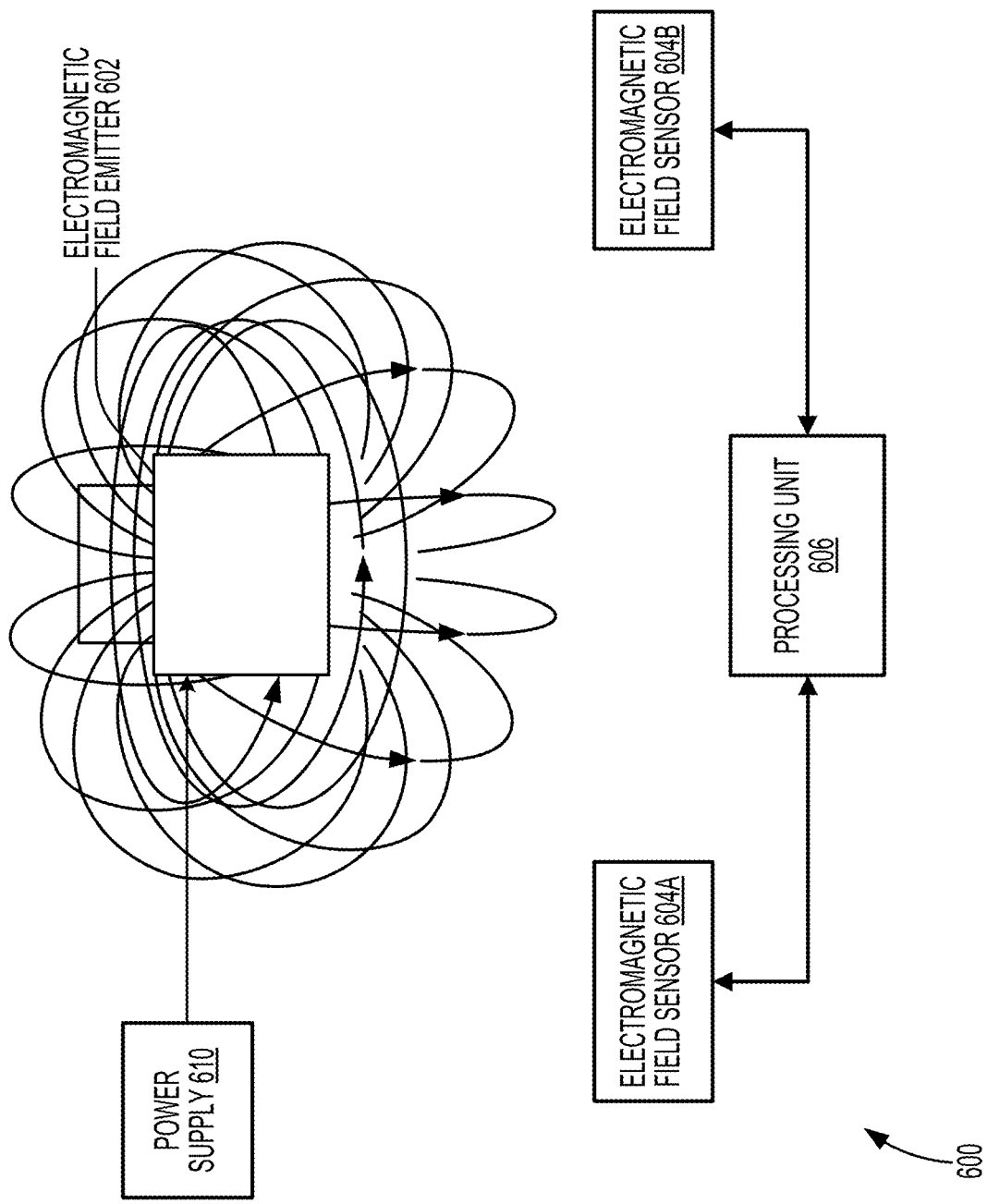
FIG. 6 illustrates an example of an electromagnetic tracking system that may be employed by a wearable AR/VR/MR system.

FIG. 6 illustrates an example of an electromagnetic tracking system 600 that may be employed by wearable system 500. Electromagnetic tracking system 600 may have similar components to those developed by organizations such as the Biosense® division of Johnson & Johnson Corporation, Polhemus®, Inc. of Colchester, Vermont, manufactured by Sixense® Entertainment, Inc. of Los Gatos, California, and other tracking companies. In one or more embodiments, electromagnetic tracking system 600 includes an electromagnetic field emitter 602 which is configured to emit a known magnetic field. As shown in FIG. 6, electromagnetic field emitter 602 may be coupled to a power supply 610 (e.g., electric current, batteries, etc.) to provide power to electromagnetic field emitter 602.

In one or more embodiments, electromagnetic field emitter 602 includes several coils (e.g., at least three coils positioned perpendicular to each other to produce fields in the X, Y, and Z directions) that generate magnetic fields. These magnetic fields are used to establish a coordinate space, which allows the system to map a position of the sensors in relation to the known magnetic field, and helps determine a position and/or orientation of the sensors. In one or more embodiments, electromagnetic sensors 604A, 604B, etc. may be attached to one or more real objects. Electromagnetic sensors 604 may include smaller coils in which current may be induced through the emitted electromagnetic field.

Generally the components of electromagnetic field sensors 604 may include small coils or loops, such as a set of three differently oriented (i.e., such as orthogonally oriented relative to each other) coils coupled together within a small structure such as a cube or other container, that are positioned/oriented to capture incoming magnetic flux from the magnetic field emitted by electromagnetic field emitter 602, and by comparing currents induced through these coils, and knowing the relative positioning and orientation of the coils relative to each other, the relative position and orientation of a sensor relative to the emitter may be calculated.

Figure 7:
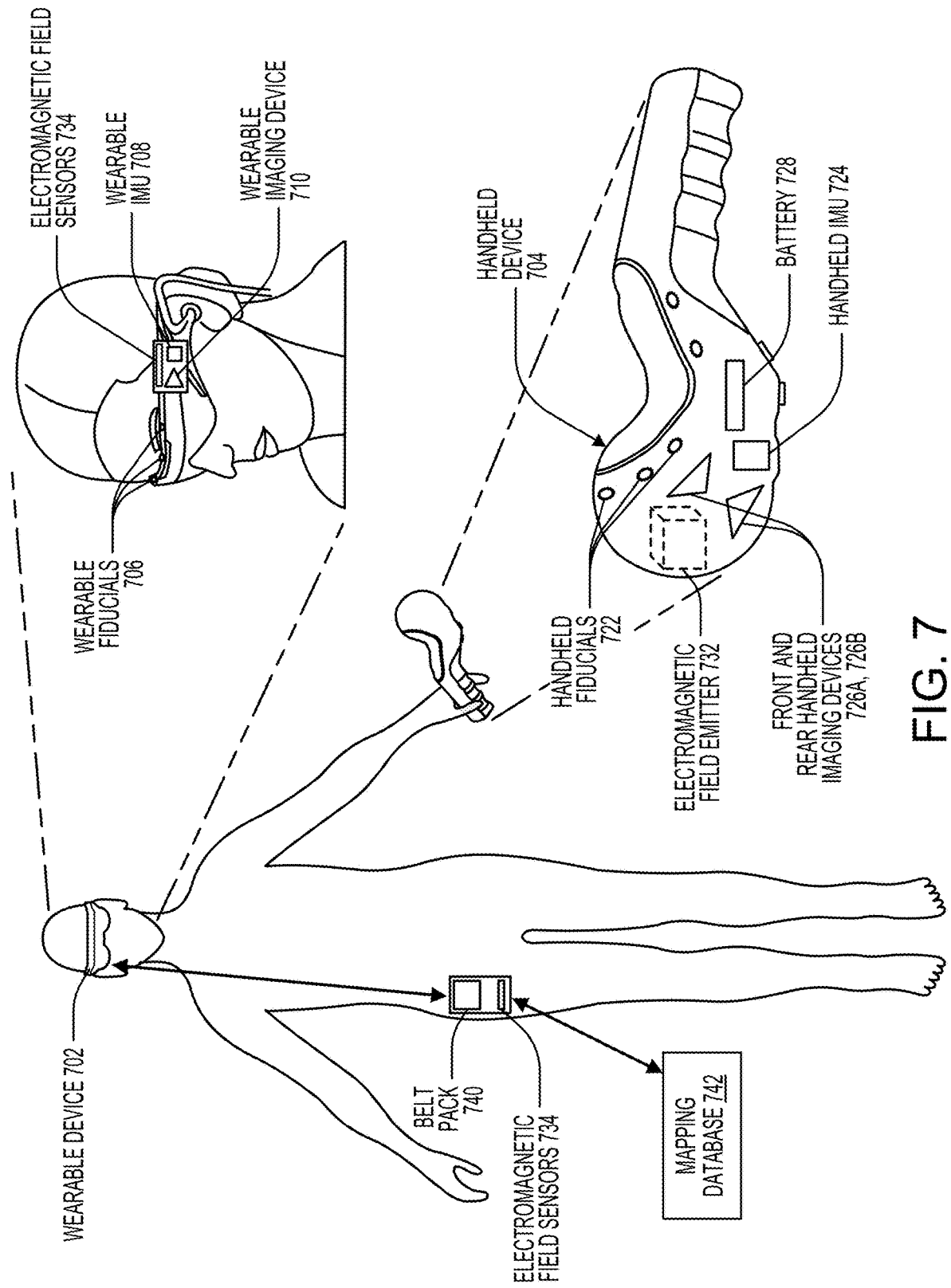
FIG. 7 illustrates an example of how a visual tracking system and/or an electromagnetic tracking system may be incorporated into a wearable AR/VR/MR system.

As will be further described in reference to FIG. 7, one or more movement sensors such as IMUs may be operatively coupled to each of electromagnetic field emitter 602 and electromagnetic field sensors 604 to detect the position and orientation of each component relative to each other and/or relative to a coordinate system. In one or more embodiments, multiple sensors (possibly including IMUs) may be used in relation to electromagnetic field emitter 602 and electromagnetic field sensors 604 to detect the position and orientation of each component. In some instances, the electromagnetic tracking system may provide positions in three directions (i.e., X, Y and Z directions), and further in two or three orientation angles. In some embodiments, measurements of the IMU(s) may be compared to the measurements of the coil to determine a position and orientation of the sensors. In one or more embodiments, both EM data and movement data, along with various other sources of data, such as cameras, depth sensors, and other sensors, may be combined to determine the position and orientation. This information may be transmitted (e.g., wireless communication, Bluetooth, etc.) to a processing unit 606. In some embodiments, pose may be reported at a relatively high refresh rate in conventional systems.

Conventionally an electromagnetic emitter is coupled to a relatively stable and large object, such as a table, operating table, wall, or ceiling, and one or more sensors are coupled to smaller objects, such as medical devices, handheld gaming components, or the like. Alternatively, various features of the electromagnetic tracking system may be employed to produce a configuration wherein changes or deltas in position and/or orientation between two objects that move in space relative to a more stable global coordinate system may be tracked. For example, a configuration is shown in FIG. 7 wherein a variation of an electromagnetic tracking system may be utilized to track position and orientation delta between a head-mounted component and a handheld component, while head pose relative to the global coordinate system (say of the room environment local to the user) is determined otherwise, such as by simultaneous localization and mapping (SLAM) techniques using outward-capturing cameras which may be coupled to the head mounted component of the system.

Processing unit 606 may control electromagnetic field emitter 602, and may also capture data from the various electromagnetic field sensors 604. It should be appreciated that the various components of the system may be coupled to each other through any electro-mechanical or wireless means. Processing unit 606 may also include data regarding the known magnetic field, and the coordinate space in relation to the magnetic field. This information is then used to detect the position and orientation of the sensors in relation to the coordinate space corresponding to the known electromagnetic field.

One advantage of electromagnetic tracking systems is that they produce highly accurate tracking results with minimal latency and high resolution. Additionally, the electromagnetic tracking system does not necessarily rely on optical trackers, and sensors/objects not in the user's line of vision may be easily tracked. It should be appreciated that the strength of the electromagnetic field drops as a cubic function of distance from a coil transmitter (e.g., electromagnetic field emitter 602). Thus, processing unit 606 may be configured to execute certain functions, such as algorithms predicting a distance based on a measured strength, to determine a position and orientation of the sensor/object at varying distances away from electromagnetic field emitter 602.

Given the rapid decline of the strength of the electromagnetic field as one moves farther away from the electromagnetic emitter, best results, in terms of accuracy, efficiency and low latency, may be achieved at closer distances. In typical electromagnetic tracking systems, the electromagnetic field emitter is powered by electric current (e.g., plug-in power supply) and has sensors located within 20 ft radius away from the electromagnetic field emitter. A shorter radius between the sensors and field emitter may be more desirable in many applications, including AR applications.

FIG. 7 illustrates an example of how a visual tracking system and/or an electromagnetic tracking system may be incorporated into a wearable AR/VR/MR system having a wearable device 702 (e.g., a headset) and a handheld device 704 (e.g., a controller). In some embodiments, handheld device 704 may be a handheld controller that allows a user to provide an input to the wearable system. For example, handheld device 704 may be a totem to be used in a gaming scenario. Handheld device 704 may be a haptic device and may include one or more haptic surfaces utilizing a variety of sensor types. During operation of the wearable system, a user may hold handheld device 704 in their left or right hand by actively gripping handheld device 704 and/or by securing an attachment mechanism (e.g., a wraparound strap) to the user's hand.

Handheld device 704 may include one or more fiducials (referred to herein as handheld fiducials 722) positioned along one or more exterior surfaces of handheld device 704 such that the fiducials may be within the field of view of an imaging device external to handheld device 704. Handheld fiducials 722 may have a known relationship with respect to each other such that an imaging device may determine its position and/or orientation with respect to handheld device 704 by capturing an image of one or more of handheld fiducials 722. Handheld fiducials 722 may be dynamic, static, electrically powered, unpowered, and may, in some embodiments, be distinguishable from each other. For example, a first fiducial may be a light-emitting diode (LED) having a first wavelength and a second fiducial may be an LED having a second wavelength. Alternatively or additionally, different fiducials may have different brightness and/or may pulsate at different frequencies (e.g., a first fiducial may pulsate at 100 Hz and a second fiducial may pulsate at 150 Hz).

Handheld device 704 may include one or more imaging devices (referred to herein as handheld imaging devices 726) positioned in a manner such that wearable device 702 and/or some feature in the surroundings of handheld device 704 is within the field of view(s) of the imaging device(s) when handheld device 704 is being held by a user. For example, a front handheld imaging device 726A may be positioned such that its field of view is oriented away from the user towards one or more features in the surroundings of handheld device 704, and a rear handheld imaging device 726B may be positioned such that its field of view is oriented towards wearable device 702. Handheld imaging devices 726 may include one or more front-facing imaging devices and/or one or more rear-facing imaging devices to create a desired cumulative field of view. In some embodiments, handheld imaging devices 726 may be optical devices such as cameras and may capture still or moving images.

Handheld device 704 may include an IMU (referred to herein as handheld IMU 724) that is rigidly secured within handheld device 704 such that rotational and linear movement of handheld device 704 is similarly experienced by handheld IMU 724. In some instances, handheld IMU 724 may include one or more accelerometers (e.g., three), one or more gyroscopes (e.g., three), one or more magnetometers (e.g., three), and/or digital signal processing hardware and software to convert raw measurements into processed data. For example, handheld IMU 724 may include an accelerometer, a gyroscope, and a magnetometer for each of three axes. For each axis, handheld IMU 724 may output one or more of: linear position, linear velocity, linear acceleration, rotational position, rotational velocity, and/or rotational acceleration. Alternatively or additionally, handheld IMU 724 may output raw data from which any of the above-mentioned forms of processed data may be calculated.

Handheld device 704 may comprise a rechargeable and/or replaceable battery 728 or other power supply that powers handheld fiducials 722, handheld imaging devices 726, handheld IMU 724, electromagnetic field emitter 732 and any other components of handheld device 704. Although not illustrated in FIG. 7, handheld device 704 may include circuitry for enabling wireless communication with wearable device 702 and/or belt pack 740. For example, upon detecting or capturing data using handheld imaging devices 726 and handheld IMU 724, handheld device 704 may transmit raw or processed data to wearable device 702 and/or belt pack 740.

Wearable device 702 may include one or more fiducials (referred to herein as wearable fiducials 706) positioned along one or more exterior surfaces of wearable device 702 such that the fiducials may be within the field of view of rear handheld imaging device 726B. Wearable fiducials 706 may have a known relationship with respect to each other such that an imaging device may determine its position and/or orientation with respect to wearable device 702 by capturing an image of one or more of wearable fiducials 706. Wearable fiducials 706 may be dynamic, static, electrically powered, unpowered, and may, in some embodiments, be distinguishable from each other. For example, a first fiducial may be an LED having a first wavelength and a second fiducial may be an LED having a second wavelength. Alternatively or additionally, different fiducials may have different brightness and/or may pulsate at different frequencies.

Wearable device 702 may include one or more imaging devices (referred to herein as wearable imaging device 710) positioned in a manner such that handheld device 704 (specifically handheld fiducials 722) is within the field of view(s) of the imaging device(s) when handheld device 704 is being held by a user. For example, one or more wearable imaging devices 710 may be positioned front-facing on wearable device 702 above, below, and/or to the side of an optical see-through component of wearable device 702. In one embodiment, two wearable imaging devices 710 may be positioned on opposite sides of the optical see-through component of wearable device 702. In some embodiments, wearable imaging devices 710 may be optical devices such as cameras and may capture still or moving images.

Wearable device 702 may include an IMU (referred to herein as wearable IMU 708) that is rigidly secured within wearable device 702 such that rotational and linear movement of wearable device 702 is similarly experienced by wearable IMU 708. In some instances, wearable IMU 708 may include one or more accelerometers (e.g., three), one or more gyroscopes (e.g., three), one or more magnetometers (e.g., three), and/or digital signal processing hardware and software to convert raw measurements into processed data. For example, wearable IMU 708 may include an accelerometer, a gyroscope, and a magnetometer for each of three axes. For each axis, wearable IMU 708 may output one or more of: linear position, linear velocity, linear acceleration, rotational position, rotational velocity, and/or rotational acceleration. Alternatively or additionally, wearable IMU 708 may output raw data from which any of the above-mentioned forms of processed data may be calculated.

In some embodiments, the wearable system may include a belt pack 740, which may include a computing apparatus (e.g., one or more processors and an associated memory) for performing a localization of handheld device 704 with respect to wearable device 702. Alternatively or additionally, the computing apparatus may reside in wearable device 702 itself, or even handheld device 704. The computing apparatus may receive (via a wired and/or wireless connection) raw or processed data from each of wearable IMU 708, wearable imaging device 710, handheld IMU 724, and handheld imaging devices 726, and may compute a geospatial position of handheld device 704 (with respect to the geospatial position of wearable device 702) and an orientation of handheld device 704 (with respect to the orientation of wearable device 702). The computing apparatus may in turn comprise a mapping database 742 (e.g., passable world model, coordinate space, etc.) to detect pose, to determine the coordinates of real objects and virtual objects, and may even connect to cloud resources and the passable world model, in one or more embodiments. In some embodiments, images captured using wearable imaging device 710 and/or handheld imaging devices 726 may be used to build a passable world model. For example, features may be detected in the captured images, and the collected data (e.g., sparse points) may be used for building the passable world model or environmental maps otherwise.

The wearable system may include an electromagnetic field emitter 732 incorporated as part of handheld device 704. In some embodiments, electromagnetic field emitter 732 may be incorporated as part of belt pack 470 or wearable device 702. In some embodiments, data from an IMU or other movement sensor may assist in determining the position and/or orientation of electromagnetic field emitter 732. This may be beneficial in cases where both electromagnetic field emitter 732 and electromagnetic field sensors 734 are mobile. Placing electromagnetic field emitter 732 in the handheld controller rather than the belt pack, as shown in the example of FIG. 7, can ensure that the electromagnetic field emitter is not competing for resources at the belt pack, but is instead using battery 728 at handheld device 704.

In some embodiments, electromagnetic sensors 734 may be positioned relative to wearable device 702, such as placed on one or more locations on wearable device 702 and/or on or more locations on belt pack 740. Since electromagnetic sensors 734 can be engineered to be small (and hence may be less sensitive, in some cases), having multiple sensors may improve efficiency and precision.

In many instances, conventional electromagnetic emitters may be too bulky for wearable devices. Therefore the electromagnetic field emitter may be engineered to be compact, using smaller coils compared to traditional systems. However, given that the strength of the electromagnetic field decreases as a cubic function of the distance away from the field emitter, a shorter radius between electromagnetic field sensors 734 and electromagnetic field emitter 732 (e.g., about 3-3.5 ft) may reduce power consumption when compared to conventional systems. This aspect may either be utilized to prolong the life of battery 728 that may power handheld device 704 and electromagnetic field emitter 732. In some embodiments, this aspect may be utilized to reduce the size of the coils generating the magnetic field at electromagnetic field emitter 732. However, in order to get the same strength of magnetic field, the power may need to be increased. This allows for a compact electromagnetic field emitter 732 that may fit compactly at handheld device 704.

Several other changes may be made when using the electromagnetic tracking system for AR devices, which may benefit from a more efficient pose reporting rate than other applications. For example, movement-based or IMU-based pose tracking may be employed. In many cases, increased stability of the IMUs can lead to increased efficiency of the pose detection process. The IMUs may be engineered such that they remain stable up to 50-100 milliseconds. It should be appreciated that some embodiments may utilize an outside pose estimator module (e.g., IMUs may drift over time) that may enable pose updates to be reported at a rate of 10-20 Hz. By keeping the IMUs stable at a reasonable rate, the rate of pose updates may be decreased to 10-20 Hz (as compared to higher frequencies in conventional systems).

If the electromagnetic tracking system can be run at a 10% duty cycle (e.g., only pinging for ground truth every 100 milliseconds), this would be an additional way to save power at the wearable system. This would mean that the electromagnetic tracking system wakes up every 10 milliseconds out of every 100 milliseconds to generate a pose estimate. This directly translates to power consumption savings, which may, in turn, affect size, battery life and cost of the wearable system. In one or more embodiments, this reduction in duty cycle may be strategically utilized by providing two handheld devices (not shown) rather than just one. For example, the user may be playing a game that requires two totems, etc. Or, in a multi-user game, two users may have their own totems/handheld controllers to play the game. When two controllers (e.g., symmetrical controllers for each hand) are used rather than one, the controllers may operate at offset duty cycles. The same concept may also be applied to controllers utilized by two different users playing a multiplayer game, for example.

Figure 8A:
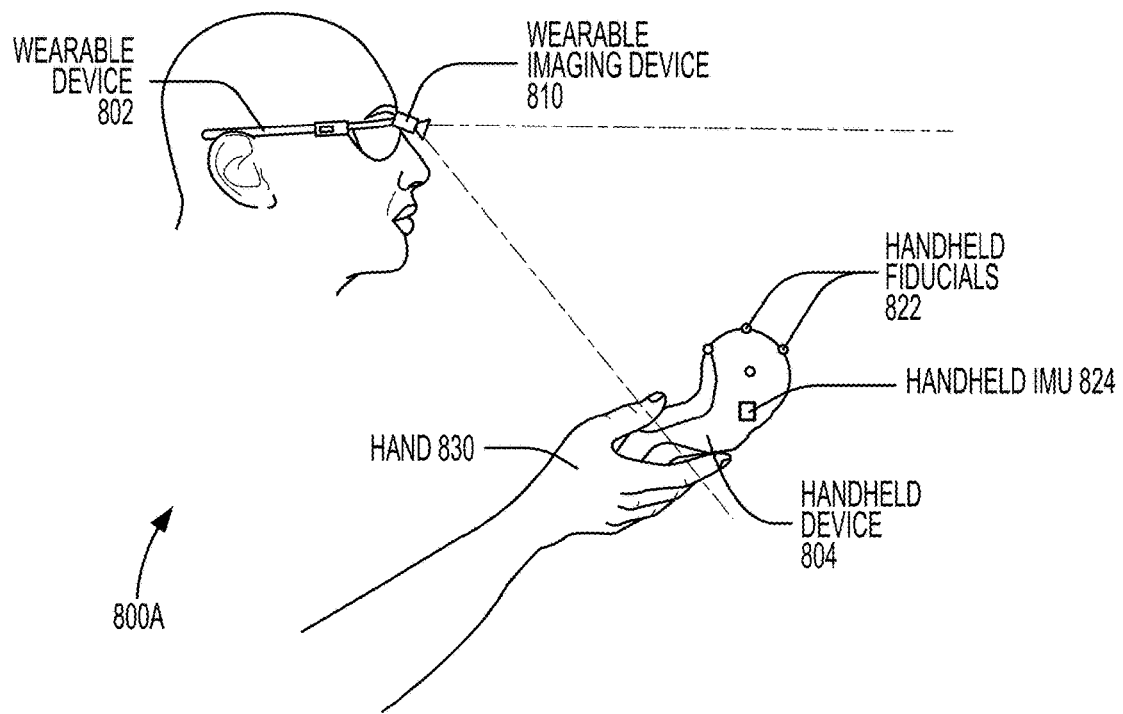
FIGS. 8A-8E illustrate various example configurations of wearable AR/VR/MR systems for tracking poses of a wearable device, a handheld device, and/or a user's hand.

FIGS. 8A-8D illustrate various example configurations of wearable AR/VR/MR systems for tracking the poses of a wearable device 802, a handheld device 804, and/or a hand 830. FIG. 8A illustrates an example configuration of a wearable system 800A in which wearable device 802 includes one or more wearable imaging devices 810 having a field of view that at least partially and at least temporarily includes handheld fiducials 822, and handheld device 804 includes one or more handheld fiducials 822. Wearable system 800 may include additional sensors mounted to handheld device 804 such as handheld IMU 824. One advantage of such a configuration may be the simplicity and low-power consumption of handheld device 804. Wearable system 800 may include additional sensors mounted to wearable device 802 such as wearable IMU 808.

Figure 8B:
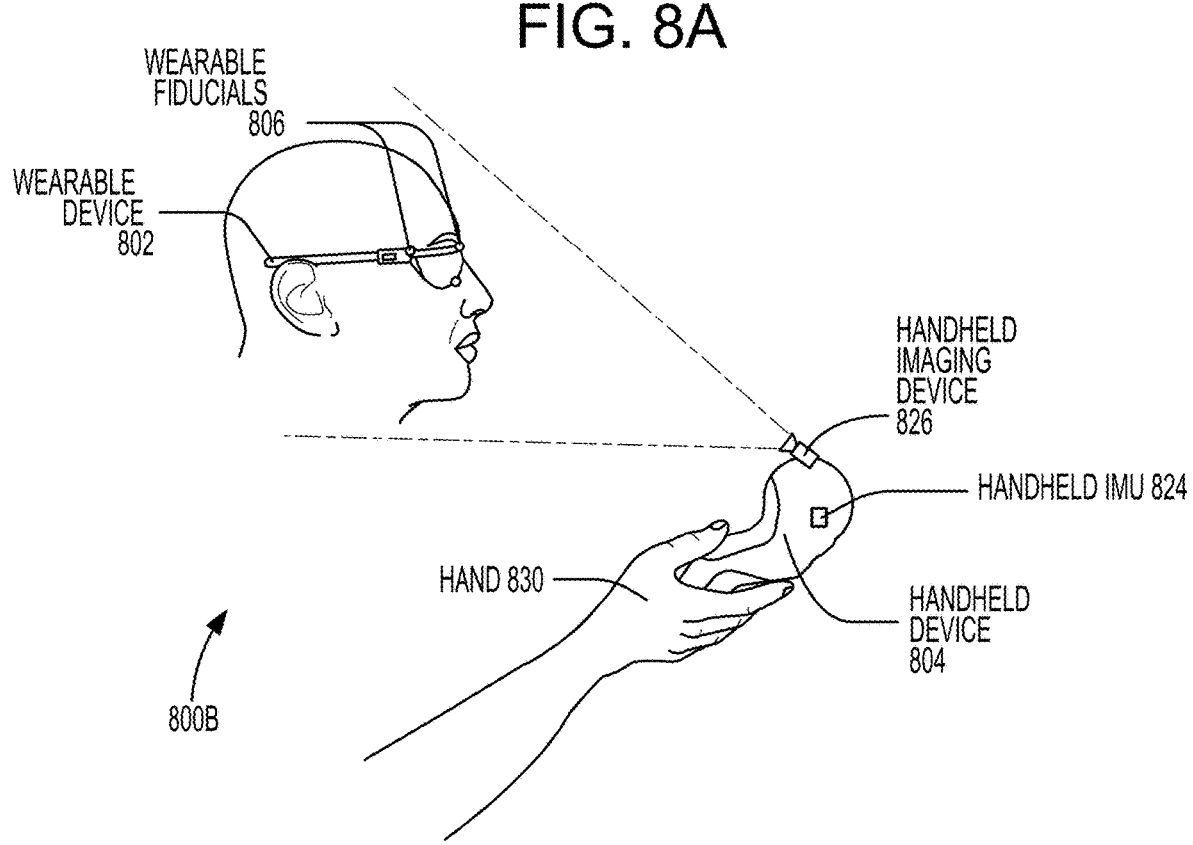

FIG. 8B illustrates an example configuration of a wearable system 800B in which wearable device 802 includes one or more wearable fiducials 806 and handheld device 804 includes one or more rear-facing handheld imaging devices 826 having a field of view that at least partially and at least temporarily includes wearable fiducials 806. Wearable system 800B may include additional sensors mounted to handheld device 804 such as handheld IMU 824. One advantage of such a configuration may be that handheld device 804 has all the data needed to perform localization of itself with respect to wearable device 802, thereby reducing the processing load on wearable device 802. Wearable system 800B may include additional sensors mounted to wearable device 802 such as wearable IMU 808.

Figure 8C:
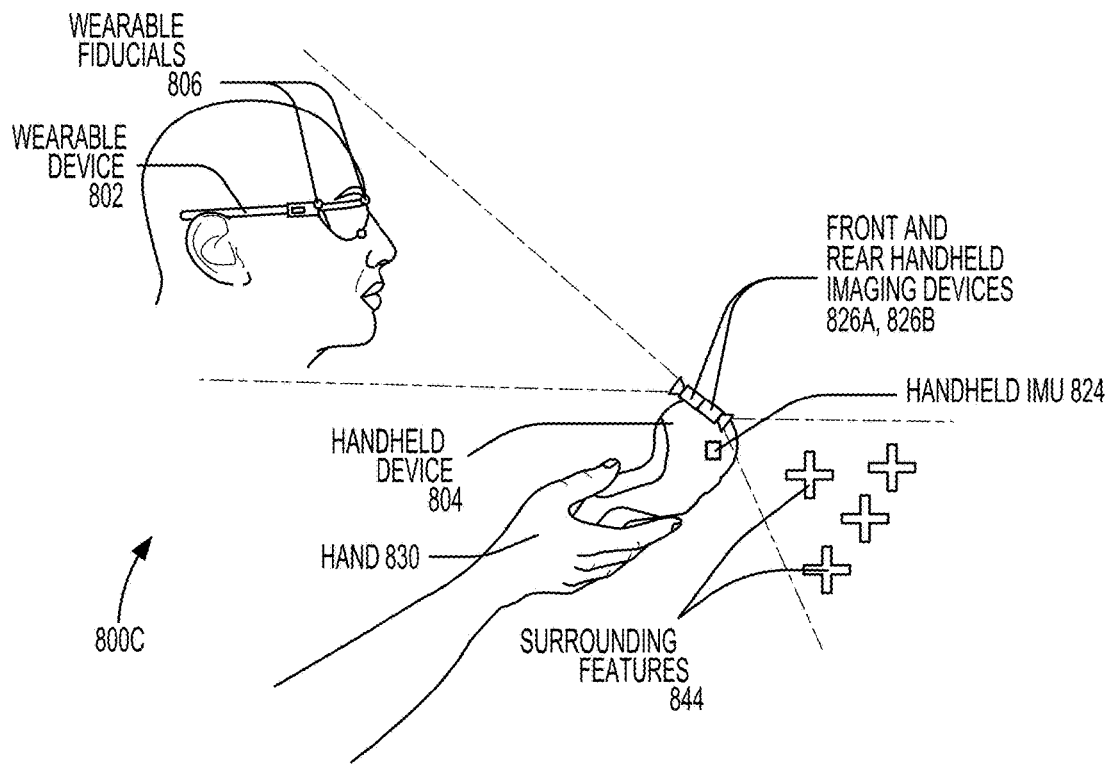

FIG. 8C illustrates an example configuration of a wearable system 800C in which handheld device 826 includes front handheld imaging device 826A having a field of view that at least partially and at least temporarily includes one or more surrounding features 844 while handheld device 804 is being held by a user and rear handheld imaging device 826B having a field of view that at least partially and at least temporarily includes one or more wearable fiducials 806. In the example configuration, multiple wearable fiducials 822 are affixed to wearable device 802. Wearable system 800C may include additional sensors mounted to handheld device 804 such as handheld IMU 824. One advantage of such a configuration may be the increased accuracy provided by the multiple imaging devices. Wearable system 800C may include additional sensors mounted to wearable device 802 such as wearable IMU 808.

Figure 8D:
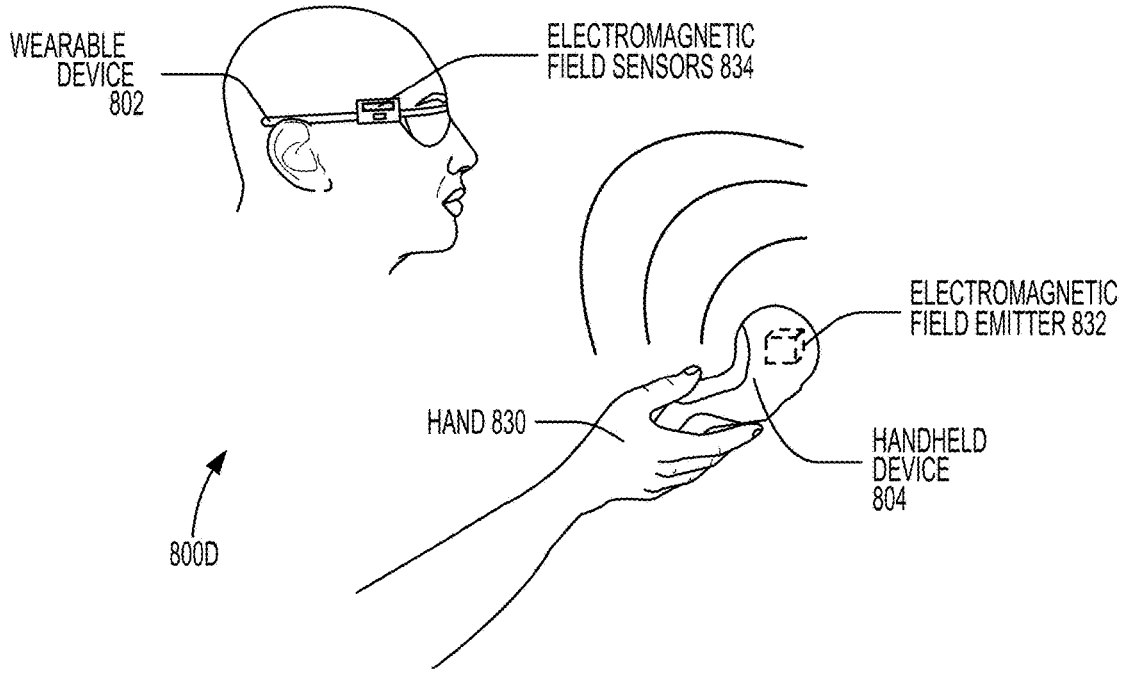
Figure 8E:
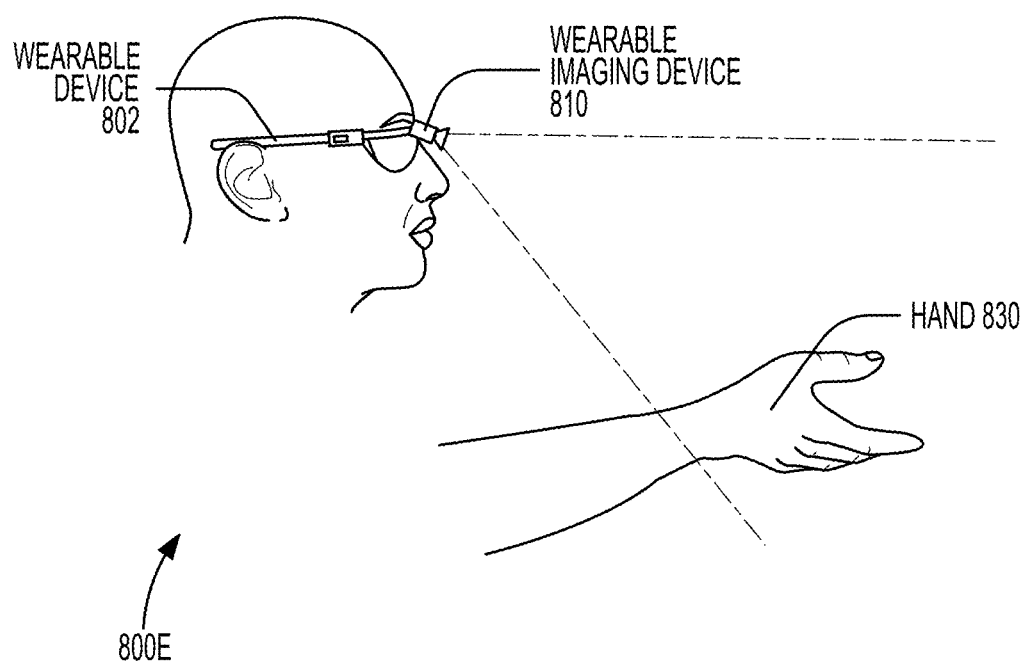

FIG. 8D illustrates an example configuration of a wearable system 800D in which wearable device 802 includes electromagnetic sensors 834 and handheld device 826 includes an electromagnetic field emitter 832, allowing the determination of the poses of wearable device and/or handheld device 804. FIG. 8E illustrates an example configuration of a wearable system 800E in which wearable device 802 includes one or more wearable imaging devices 810 having a field of view that at least partially and at least temporarily includes hand 830, allowing the determination of the pose of hand 830.

Figure 9:
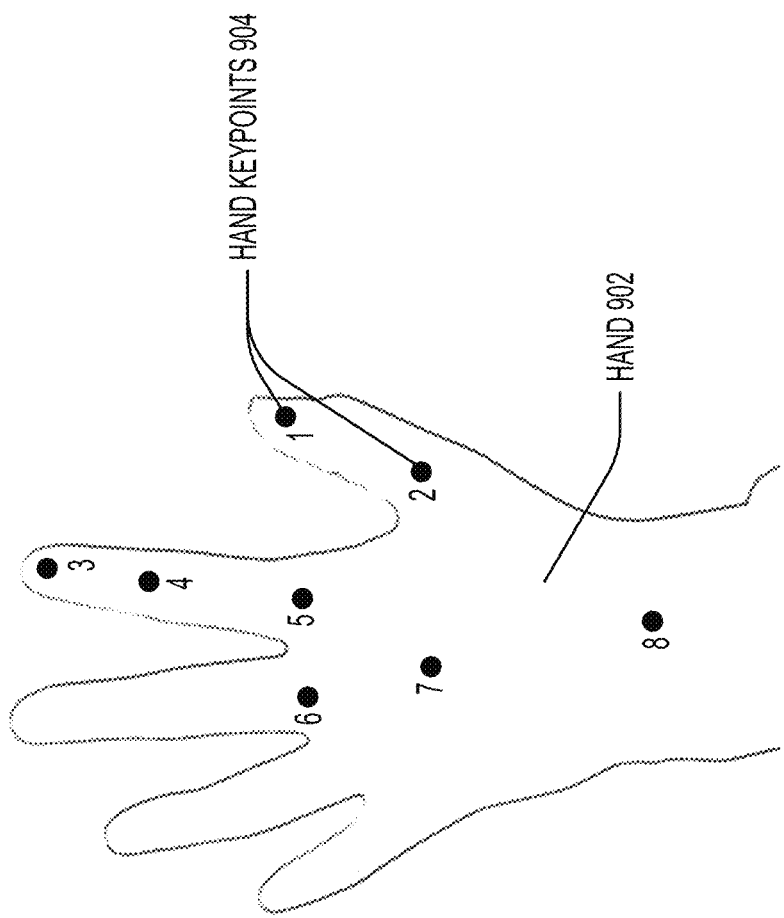
FIG. 9 illustrates an example of a set of hand keypoints that may be identified based on a captured image or video of a user's hand.

FIG. 9 illustrates an example of a set of hand keypoints 904 that may be identified based on a captured image or video of a user's hand 902. Hand keypoints 904 may be identified using various image analysis techniques such as, for example, by training a machine learning model (e.g., a neural network) using a set of labeled images. After training, the machine learning model may receive images or a stream of images as input and produce hand keypoints 904. In some embodiments, hand keypoints 904 may be used to determine the position of hand 902. For example, the position of hand 902 may be set as one of hand keypoints 904 or hand keypoints 904 may be used to compute a different position along the hand, such as the center of mass.

Figure 10:
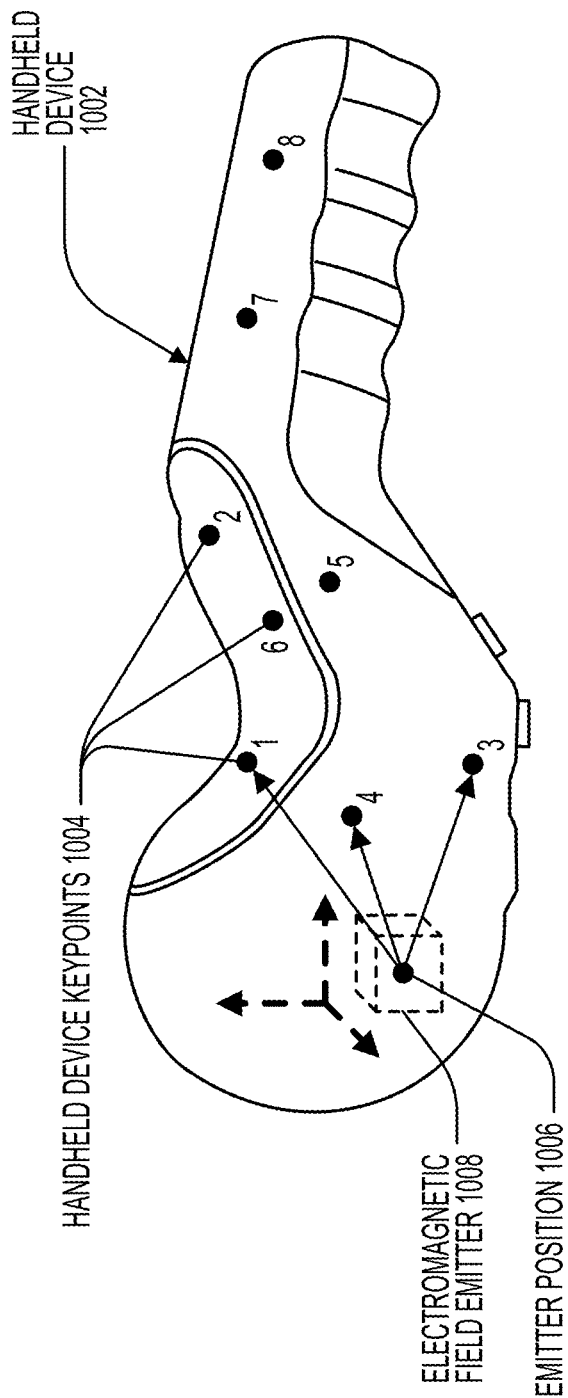
FIG. 10 illustrates an example of a set of handheld device keypoints that may be identified based on the determined pose of a handheld device and a known 3D model of a handheld device.

FIG. 10 illustrates an example of a set of handheld device keypoints 1004 that may be identified based on the determined pose of handheld device 1002 and a known 3D model of handheld device 1002. For example, the determined position of handheld device 1002 may be the position of electromagnetic field emitter 1008, or emitter position 1006, from which handheld device keypoints 1004 can be determined. In some embodiments, handheld device keypoints 1004 may correspond to the locations along handheld device 1002 that are closest to their corresponding hand keypoints, such as hand keypoints 904 illustrated in FIG. 9.

Figure 11:
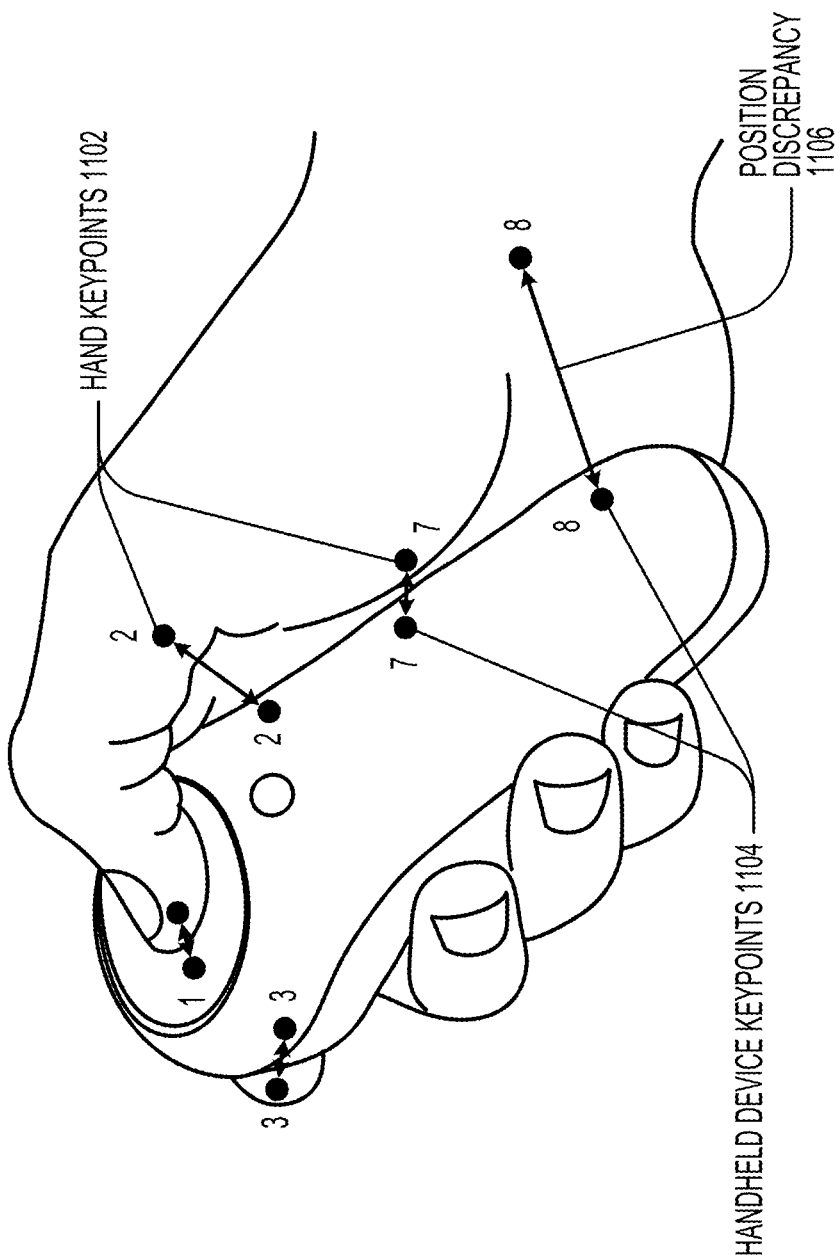
FIG. 11 illustrates an example of a set of hand keypoints and a set of handheld device keypoints that may be identified.

FIG. 11 illustrates an example of a set of hand keypoints 1102 and a set of handheld device keypoints 1104 that may be identified. In some embodiments, a position discrepancy 1106 may be calculated between two corresponding keypoints (e.g., one keypoint from hand keypoints 1102 and one keypoint from handheld device keypoints 1104) as the distance between them. In some embodiments, a plurality of position discrepancies 1106 may be calculated between corresponding keypoints, which may be combined into a total position discrepancy. In some embodiments, position discrepancy 1106 may be calculated as the maximum, minimum, or average distance between corresponding keypoints. Other possibilities are contemplated.

FIGS. 12A-12F illustrate a method 1200 for performing hand and totem input fusion for a wearable system such as an AR/VR/MR system. One or more steps of method 1200 may be omitted during performance of method 1200, and steps of method 1200 need not be performed in the order shown. One or more steps of method 1200 may be performed by one or more processors, such as those included in local processing and data module 570 or remote processing module 572.

Figure 12A:
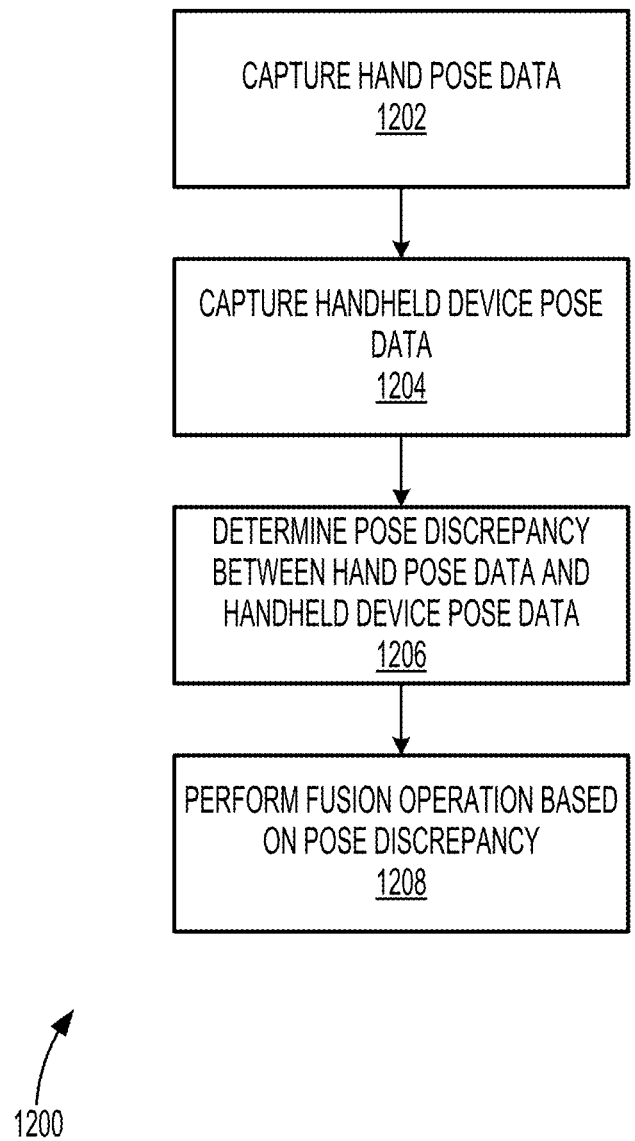
FIGS. 12A-12F illustrate a method for performing hand and totem input fusion for a wearable system.
Figure 12B:
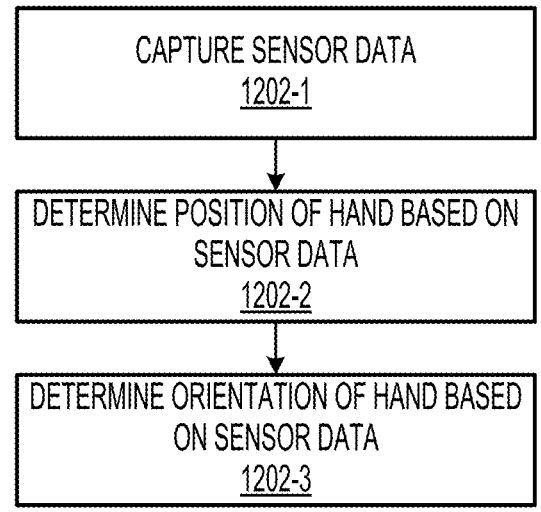
Figure 12C:
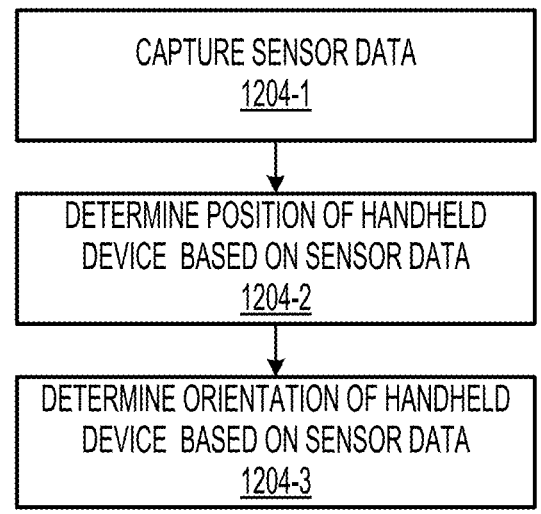
Figure 12D:
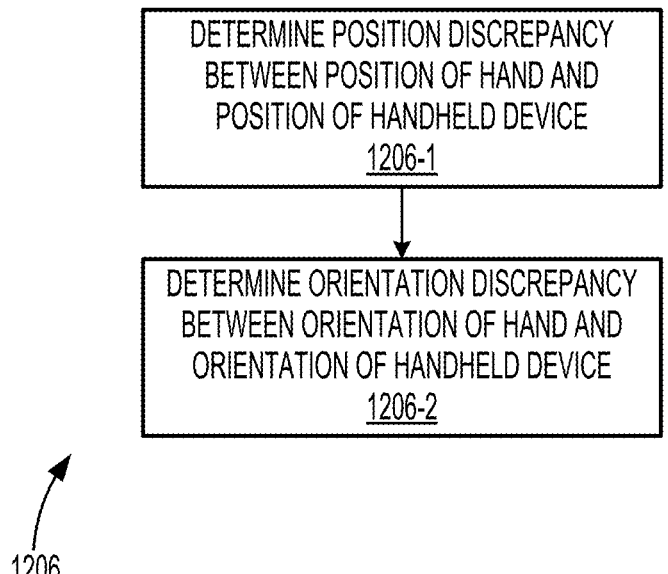

In reference to FIG. 12A, at step 1202 of method 1200, hand pose data is captured. In some embodiments, the hand pose data includes a position of a hand within a reference frame. In some embodiments, the hand pose data includes an orientation of the hand within the reference frame. In some embodiments, the hand pose data is captured using a hand pose sensor. In some embodiments, capturing the hand pose data may include capturing sensor data using the hand pose sensor and generating the hand pose data based on the captured sensor data. For example, in reference to FIG. 12B, at substep 1202-1, the sensor data is captured using the hand pose sensor. At substep 1202-2, the position of the hand is determined based on the sensor data by, for example, processing and analyzing the sensor data. At substep 1202-3, the orientation of the hand is determined based on the sensor data by, for example, processing and analyzing the sensor data.

In reference to FIG. 12A, at step 1204, handheld device pose data is captured. In some embodiments, the handheld device pose data includes a position of a handheld device within the reference frame. In some embodiments, the handheld device pose data includes an orientation of the handheld device within the reference frame. In some embodiments, the handheld device pose data is captured using a handheld device pose sensor. In some embodiments, capturing the handheld device pose data may include capturing sensor data using the handheld device pose sensor and generating the handheld device pose data based on the captured sensor data. For example, in reference to FIG. 12C, at substep 1204-1, the sensor data is captured using the handheld device pose sensor. At substep 1204-2, the position of the handheld device is determined based on the sensor data by, for example, processing and analyzing the sensor data. At substep 1204-3, the orientation of the handheld device is determined based on the sensor data by, for example, processing and analyzing the sensor data.

In some embodiments, the hand pose sensor and the handheld device pose sensor are the same sensor. For example, an image capture device mounted to a headset may gather information about the poses of both devices and accordingly may be the hand pose sensor and the handheld device pose sensor. In some embodiments, the hand pose sensor and the handheld device pose sensor are different from each other. For example, the hand pose sensor may be an image capture device and the handheld device pose sensor may be an electromagnetic transmitter and an electromagnetic receiver.

In reference to FIG. 12A, at step 1206, a pose discrepancy between hand pose data and handheld device pose data is determined. In some embodiments, the pose discrepancy includes a position discrepancy between the positions of the hand and the handheld device. For example, in reference to FIG. 12D, at substep 1206-1, the position discrepancy between the positions of the hand and the handheld device is determined. The position discrepancy may be a distance between the two positions or some other distance metric based on the two positions. In some embodiments, the pose discrepancy includes an orientation discrepancy between the orientations of the hand and the handheld device. For example, in reference to FIG. 12D, at substep 1206-2, the orientation discrepancy between the orientations of the hand and the handheld device is determined. The orientation discrepancy may be an angle offset between the two orientations or some other measure of angle offset based on the two orientations. In some embodiments, the angle offset is not limited to a single angle and the angle offset could include more than one angle.

In reference to FIG. 12A, at step 1208, a fusion operation is performed based on the pose discrepancy. In some embodiments, the fusion operation may be based on whether the distance between the positions of the hand and the handheld device is greater than or less than a distance threshold. For example, in reference to FIG. 12E, at substep 1208-1, it is determined whether the distance is greater than or less than the distance threshold. If it is determined that the distance is greater than the distance threshold, method 1200 proceeds to substep 1208-2. If it is determined that the distance is less than the distance threshold, method 1200 proceeds to substep 1208-4. At substep 1208-2, it is determined that the handheld device is not being held by the hand. At substep 1208-3, the hand pose data is suppressed such that performing the fusion operation includes suppressing the hand pose data. In some embodiments, suppressing the hand pose data includes not using and/or considering the hand pose data as a direct input to the processing module(s). In some embodiments, suppressing the hand pose data includes not using and/or considering the hand pose data for any determination of the position and/or orientation of the handheld device.

At substep 1208-4, it is determined that the handheld device is being held by the hand. At substep 1208-5, the hand pose data is used to augment the handheld device pose data such that performing the fusion operation includes using the hand pose data to augment the handheld device pose data. In some embodiments, using the hand pose data to augment the handheld device pose data includes using the hand pose data in any determination of the position and/or orientation of the handheld device.

Figure 12E:
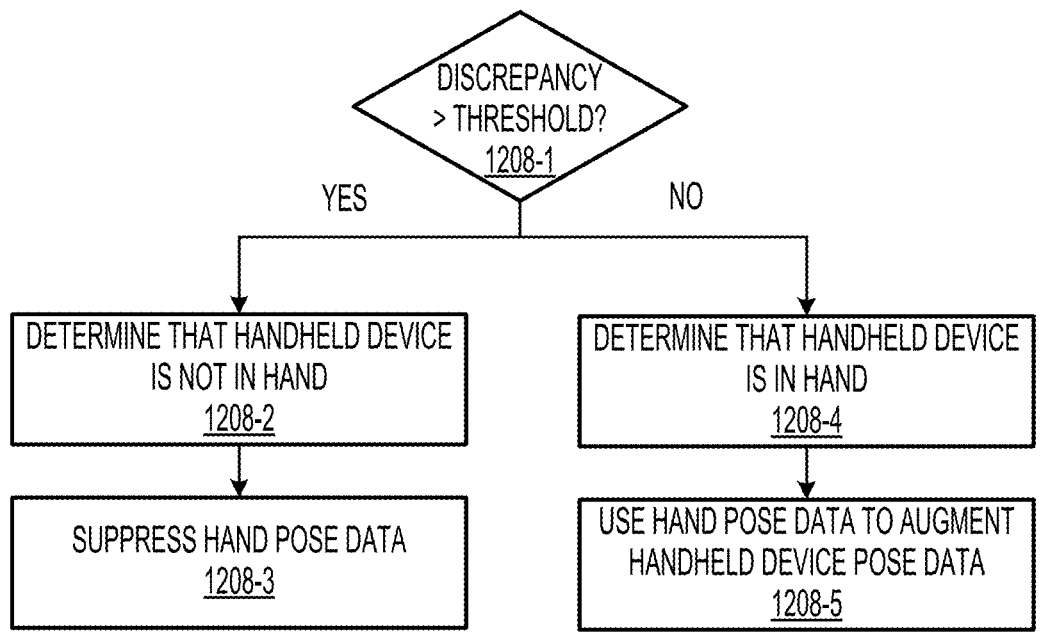
Figure 12F:
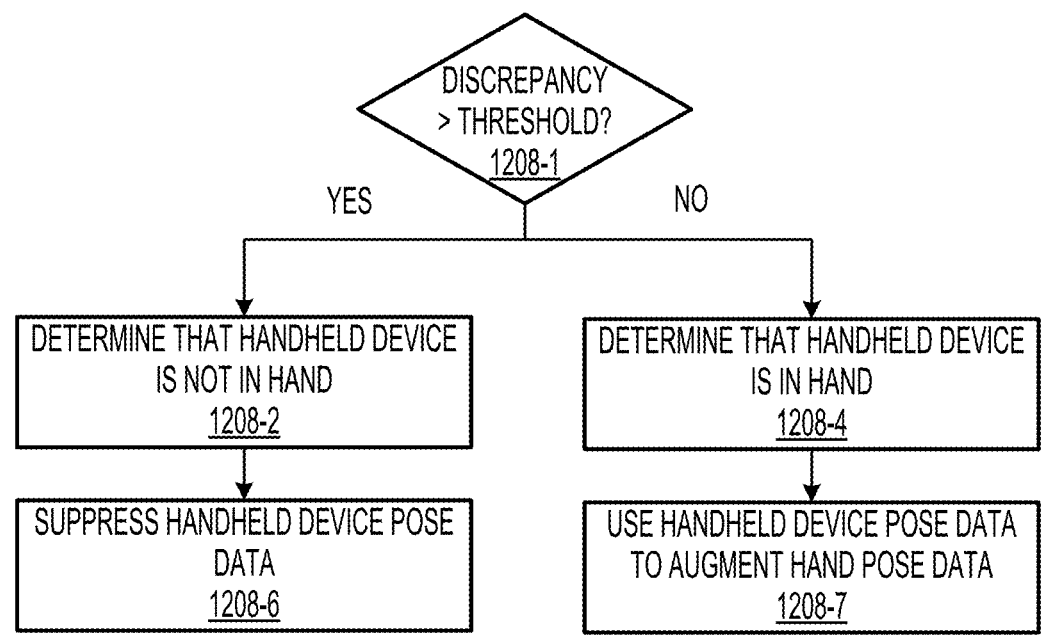

As another example, in reference to FIG. 12F, substeps 1208-1, 1208-2, and 1208-4 are performed similar to that described in reference to FIG. 12E. At substep 1208-6, the handheld device pose data is suppressed such that performing the fusion operation includes suppressing the handheld device pose data. In some embodiments, suppressing the handheld device pose data includes not using and/or considering the handheld device pose data as a direct input to the processing module(s). In some embodiments, suppressing the handheld device pose data includes not using and/or considering the handheld device pose data for any determination of the position and/or orientation of the hand.

At substep 1208-7, the handheld device pose data is used to augment the hand pose data such that performing the fusion operation includes using the handheld device pose data to augment the hand pose data. In some embodiments, using the handheld device pose data to augment the hand pose data includes using the handheld device pose data in any determination of the position and/or orientation of the hand.

Figure 13:
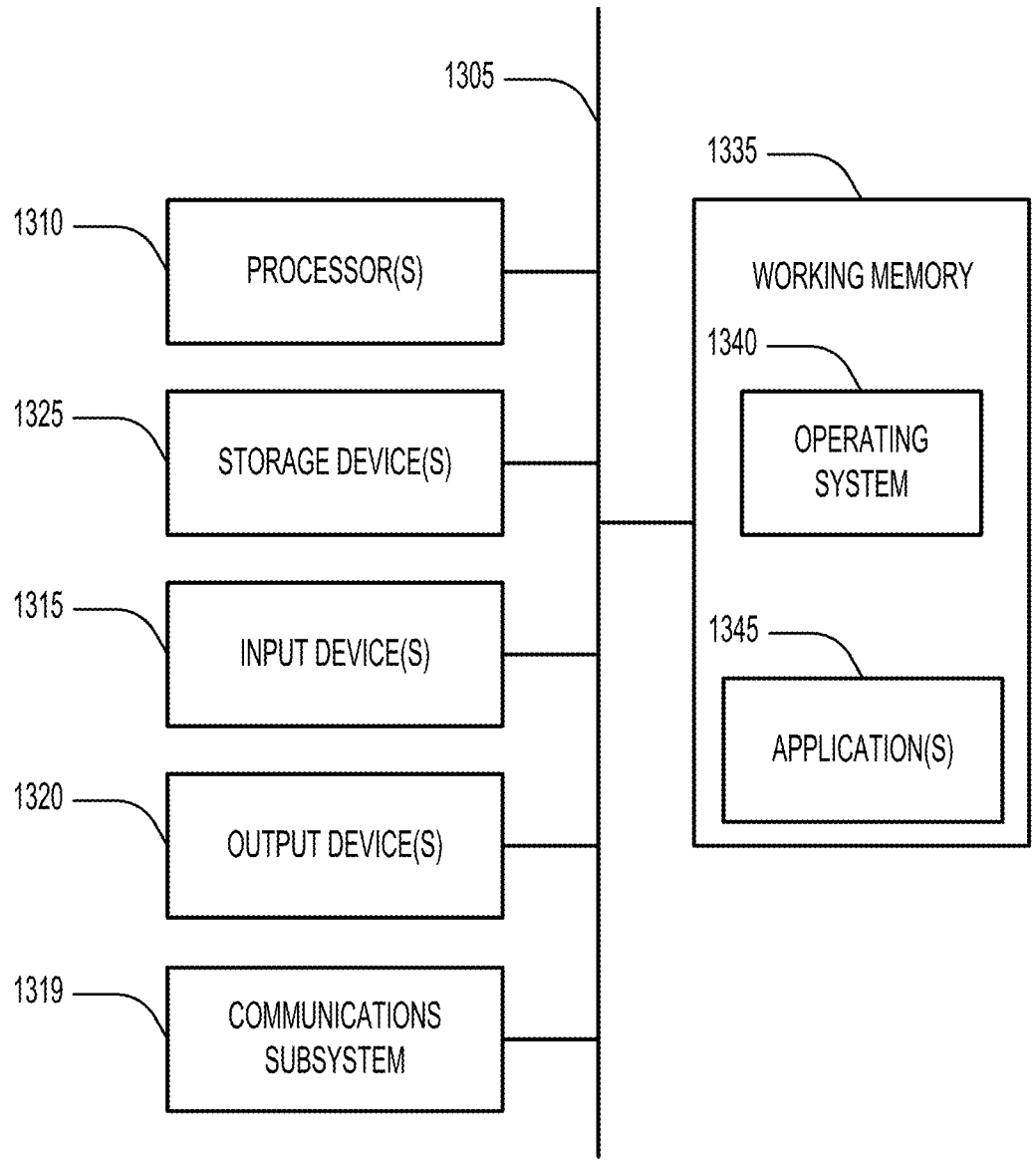
FIG. 13 illustrates a computer system.

FIG. 13 illustrates a simplified computer system 1300 according to an embodiment described herein. Computer system 1300 as illustrated in FIG. 13 may be incorporated into devices described herein. FIG. 13 provides a schematic illustration of one embodiment of computer system 1300 that can perform some or all of the steps of the methods provided by various embodiments. It should be noted that FIG. 13 is meant only to provide a generalized illustration of various components, any or all of which may be utilized as appropriate. FIG. 13, therefore, broadly illustrates how individual system elements may be implemented in a relatively separated or relatively more integrated manner.

Computer system 1300 is shown including hardware elements that can be electrically coupled via a bus 1305, or may otherwise be in communication, as appropriate. The hardware elements may include one or more processors 1310, including without limitation one or more general-purpose processors and/or one or more special-purpose processors such as digital signal processing chips, graphics acceleration processors, and/or the like; one or more input devices 1315, which can include without limitation a mouse, a keyboard, a camera, and/or the like; and one or more output devices 1320, which can include without limitation a display device, a printer, and/or the like.

Computer system 1300 may further include and/or be in communication with one or more non-transitory storage devices 1325, which can include, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1300 might also include a communications subsystem 1319, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1319 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1319. In other embodiments, a portable electronic device, e.g., the first electronic device, may be incorporated into computer system 1300, e.g., an electronic device as an input device 1315. In some embodiments, computer system 1300 will further include a working memory 1335, which can include a RAM or ROM device, as described above.

Computer system 1300 also can include software elements, shown as being currently located within the working memory 1335, including an operating system 1340, device drivers, executable libraries, and/or other code, such as one or more application programs 1345, which may include computer programs provided by various embodiments, and/or may be designed to implement methods, and/or configure systems, provided by other embodiments, as described herein. Merely by way of example, one or more procedures described with respect to the methods discussed above, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1325 described above. In some cases, the storage medium might be incorporated within a computer system, such as computer system 1300. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1300 and/or might take the form of source and/or installable code, which, upon compilation and/or installation on computer system 1300 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as computer system 1300 to perform methods in accordance with various embodiments of the technology. According to a set of embodiments, some or all of the procedures of such methods are performed by computer system 1300 in response to processor 1310 executing one or more sequences of one or more instructions, which might be incorporated into the operating system 1340 and/or other code, such as an application program 1345, contained in the working memory 1335. Such instructions may be read into the working memory 1335 from another computer-readable medium, such as one or more of the storage device(s) 1325. Merely by way of example, execution of the sequences of instructions contained in the working memory 1335 might cause the processor(s) 1310 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1300, various computer-readable media might be involved in providing instructions/code to processor(s) 1310 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1325. Volatile media include, without limitation, dynamic memory, such as the working memory 1335.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1300.

The communications subsystem 1319 and/or components thereof generally will receive signals, and the bus 1305 then might carry the signals and/or the data, instructions, etc. carried by the signals to the working memory 1335, from which the processor(s) 1310 retrieves and executes the instructions. The instructions received by the working memory 1335 may optionally be stored on a non-transitory storage device 1325 either before or after execution by the processor(s) 1310.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes one or more of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of fusing hand pose data with handheld device pose data, the method comprising:
   capturing the hand pose data including positions of a set of keypoints of a hand and an orientation of the hand within a reference frame using a hand pose sensor;
   capturing the handheld device pose data including positions of a set of keypoints of a handheld device and an orientation of the handheld device within the reference frame using a handheld device pose sensor, wherein the handheld device pose sensor is different than the hand pose sensor, wherein each keypoint of the set of keypoints of the handheld device is matched to a different keypoint of the set of keypoints of the hand;
   determining a pose discrepancy between the hand pose data and the handheld device pose data, wherein determining the pose discrepancy includes:
      determining a position discrepancy based on a set of distances, wherein each distance in the set of distances corresponds to a distance between a position of a first keypoint in the set of keypoints of the handheld device and a position of a second keypoint matched to the first keypoint in the set of keypoints of the hand; and
      determining an orientation discrepancy between the orientation of the hand and the orientation of the handheld device, wherein the pose discrepancy is determined based on the position discrepancy and the orientation discrepancy; and
   performing a fusion operation based on the pose discrepancy.

2. The method of claim 1, wherein the position discrepancy is a maximum, minimum, or average distance of the set of distances.

3. The method of claim 1, further comprising:
   determining whether the pose discrepancy is greater than or less than a threshold.

4. The method of claim 3, wherein if it is determined that the pose discrepancy is greater than the threshold, performing the fusion operation includes:
   determining that the handheld device is not being held by the hand.

5. The method of claim 3, wherein if it is determined that the pose discrepancy is less than or equal to the threshold, performing the fusion operation includes:
   determining that the handheld device is being held by the hand.

6. The method of claim 3, wherein if it is determined that the pose discrepancy is greater than the threshold, performing the fusion operation includes:
   suppressing the hand pose data; or
   suppressing the handheld device pose data.

7. The method of claim 3, wherein if it is determined that the pose discrepancy is less than or equal to the threshold, performing the fusion operation includes:
   using the hand pose data to augment the handheld device pose data;
   using the handheld device pose data to augment the hand pose data; or
   generating combined pose data using the hand pose data and the handheld device pose data.

8. A system comprising:
   a hand pose sensor configured to capture hand pose data including positions of a set of keypoints of a hand and an orientation of the hand within a reference frame; and
   a handheld device pose sensor configured to capture handheld device pose data including positions of a set of keypoints of a handheld device and an orientation of the handheld device within the reference frame, wherein the handheld device pose sensor is different than the hand pose sensor, wherein each keypoint of the set of keypoints of the handheld device is matched to a different keypoint of the set of keypoints of the hand;
   one or more processors in communication with the hand pose sensor and the handheld device pose sensor, the one or more processors configured to perform operations comprising:
      determining a pose discrepancy between the hand pose data and the handheld device pose data, wherein determining the pose discrepancy includes:
         determining a position discrepancy based on a set of distances, wherein each distance in the set of distances corresponds to a distance between a position of a first keypoint in the set of keypoints of the handheld device and a position of a second keypoint matched to the first keypoint in the set of keypoints of the hand; and
         determining an orientation discrepancy between the orientation of the hand and the orientation of the handheld device, wherein the pose discrepancy is determined based on the position discrepancy and the orientation discrepancy; and
      performing a fusion operation based on the pose discrepancy.

9. The system of claim 8, wherein the position discrepancy is a maximum, minimum, or average distance of the set of distances.

10. The system of claim 8, further comprising:
    determining whether the pose discrepancy is greater than or less than a threshold.

11. The system of claim 10, wherein if it is determined that the pose discrepancy is greater than the threshold, performing the fusion operation includes:
    determining that the handheld device is not being held by the hand.

12. The system of claim 10, wherein if it is determined that the pose discrepancy is less than or equal to the threshold, performing the fusion operation includes:
    determining that the handheld device is being held by the hand.

13. The system of claim 10, wherein if it is determined that the pose discrepancy is greater than the threshold, performing the fusion operation includes:
    suppressing the hand pose data; or
    suppressing the handheld device pose data.

14. The system of claim 10, wherein if it is determined that the pose discrepancy is less than or equal to the threshold, performing the fusion operation includes:

using the hand pose data to augment the handheld device pose data;

using the handheld device pose data to augment the hand pose data; or generating combined pose data using the hand pose data and the handheld device pose data.

15. A non-transitory computer-readable medium comprising instructions that, when executed by one or more processors, cause the one or more processors to perform operations for fusing hand pose data with handheld device pose data, the operations comprising:

capturing the hand pose data including positions of a set of keypoints of a hand and an orientation of the hand within a reference frame using a hand pose sensor;

capturing the handheld device pose data including positions of a set of keypoints of a handheld device and an orientation of the handheld device within the reference frame using a handheld device pose sensor, wherein the handheld device pose sensor is different than the hand pose sensor, wherein each keypoint of the set of keypoints of the handheld device is matched to a different keypoint of the set of keypoints of the hand;

determining a pose discrepancy between the hand pose data and the handheld device pose data, wherein determining the pose discrepancy includes:

determining a position discrepancy based on a set of distances, wherein each distance in the set of distances corresponds to a distance between a position of a first keypoint in the set of keypoints of the handheld device and a position of a second keypoint matched to the first keypoint in the set of keypoints of the hand; and determining an orientation discrepancy between the orientation of the hand and the orientation of the handheld device, wherein the pose discrepancy is determined based on the position discrepancy and the orientation discrepancy; and performing a fusion operation based on the pose discrepancy.

16. The non-transitory computer-readable medium of claim 15 wherein the position discrepancy is a maximum, minimum, or average distance of the set of distances.

17. The non-transitory computer-readable medium of claim 15, further comprising:

determining whether the pose discrepancy is greater than or less than a threshold.

* * * * *